United States Patent
Haeusler

(10) Patent No.: US 11,677,931 B2
(45) Date of Patent: Jun. 13, 2023

(54) AUTOMATED REAL-TIME CALIBRATION

(71) Applicant: EMBARK TRUCKS INC., San Francisco, CA (US)

(72) Inventor: Phillip James Haeusler, San Francisco, CA (US)

(73) Assignee: Embark Trucks Inc., San Francisco, CA (US)

( * ) Notice: Subject to any disclaimer, the term of this patent is extended or adjusted under 35 U.S.C. 154(b) by 0 days.

(21) Appl. No.: 17/945,497

(22) Filed: Sep. 15, 2022

(65) Prior Publication Data

US 2023/0027622 A1 Jan. 26, 2023

Related U.S. Application Data

(63) Continuation-in-part of application No. 17/383,504, filed on Jul. 23, 2021.

(51) Int. Cl.
| | |
|---|---|
| *G06T 7/80* | (2017.01) |
| *H04N 17/00* | (2006.01) |
| *G01S 7/497* | (2006.01) |
| *G01S 17/86* | (2020.01) |
| *B60W 60/00* | (2020.01) |
| *G01S 17/931* | (2020.01) |

(52) U.S. Cl.
CPC ........ *H04N 17/002* (2013.01); *B60W 60/001* (2020.02); *G01S 7/4972* (2013.01); *G01S 17/86* (2020.01); *G01S 17/931* (2020.01); *G06T 7/80* (2017.01); *B60W 2420/52* (2013.01); *G06T 2207/10028* (2013.01); *G06T 2207/30244* (2013.01); *G06T 2207/30256* (2013.01)

(58) Field of Classification Search
CPC ....... H04N 17/002; G06T 7/80; G06T 7/4972; G01S 17/931; G01S 17/86; B60W 60/001
USPC ........................................................ 701/29.2
See application file for complete search history.

(56) References Cited

FOREIGN PATENT DOCUMENTS

JP 2018096715 * 6/2018 ............. G01C 21/28

OTHER PUBLICATIONS

JP2018096715 Machine Translation (Year: 2018).*

* cited by examiner

*Primary Examiner* — Nguyen T Truong
(74) *Attorney, Agent, or Firm* — Buckley, Maschoff & Talwalkar LLC

(57) ABSTRACT

Provided are systems and methods for detecting a vehicle with sensors that are not calibrated properly and calibrating such sensor in real-time. In one example, a method may include iteratively capturing sensor data of a road while the vehicle is travelling on the road; monitoring a calibration of the sensors of the vehicle based on the sensor data, determining that the sensors of the vehicle are not calibrated properly based on the monitoring, generating a calibration target of an object on the road based on the sensor data, and adjusting a calibration parameter of the one or more sensors of the vehicle based on the generated calibration target.

20 Claims, 19 Drawing Sheets

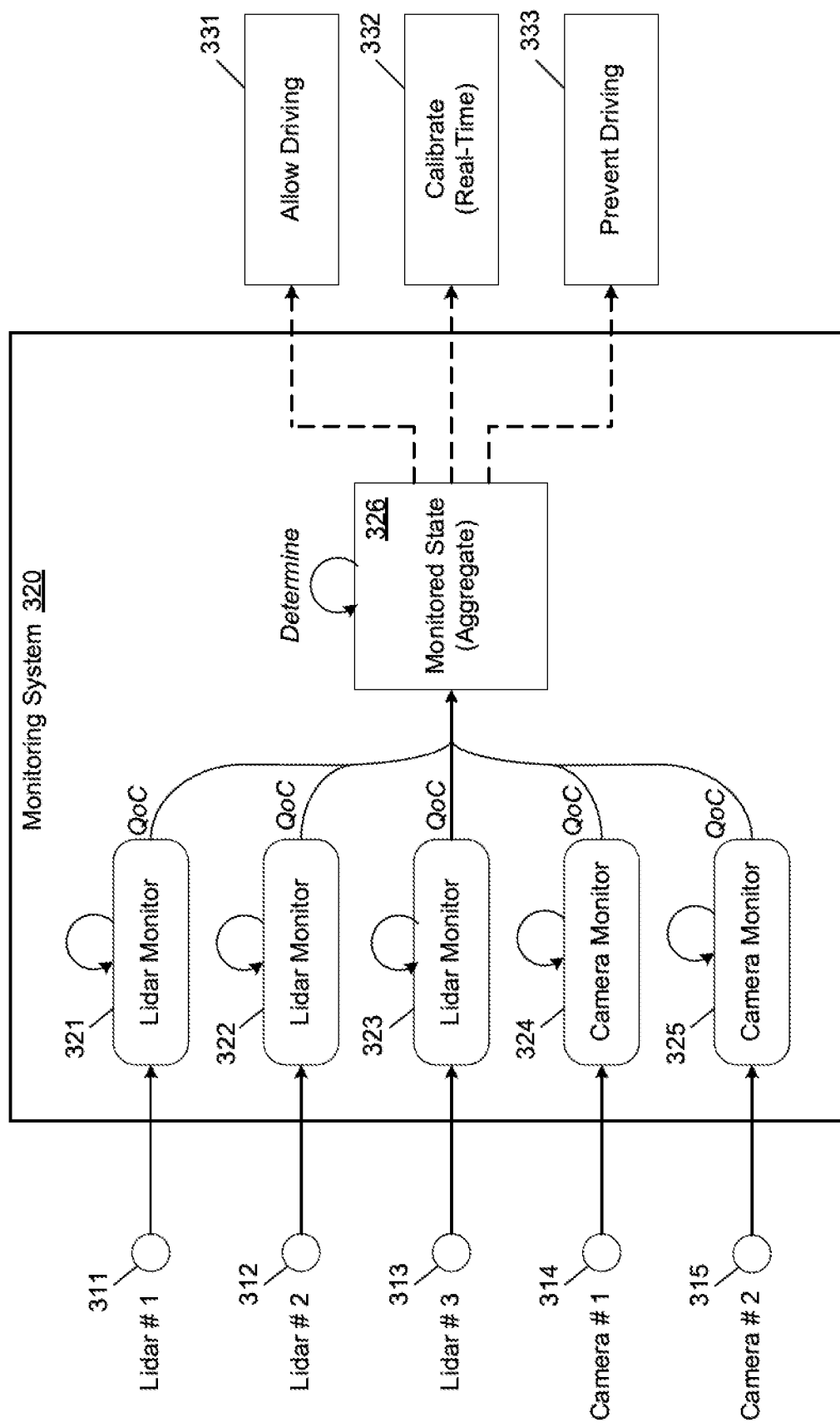

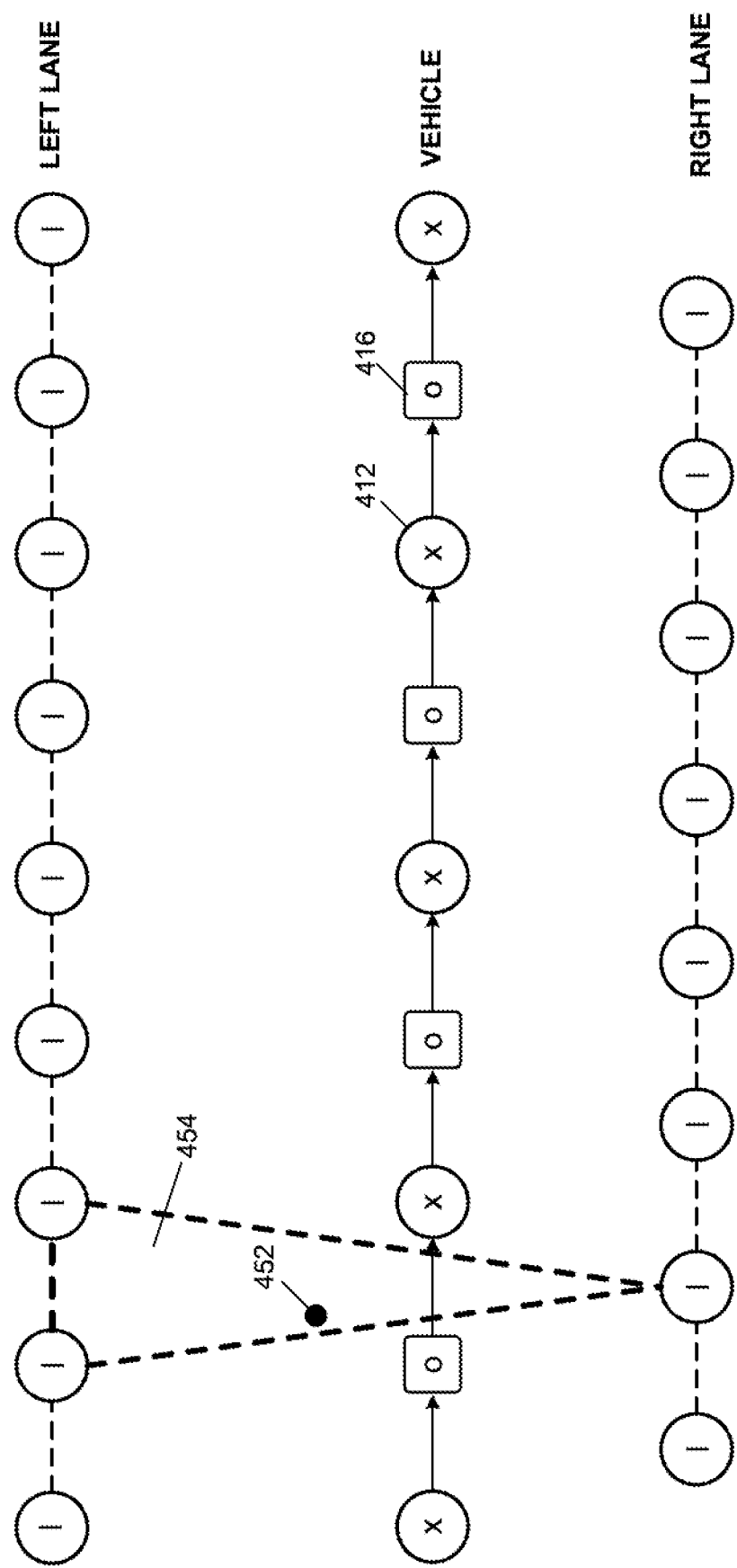

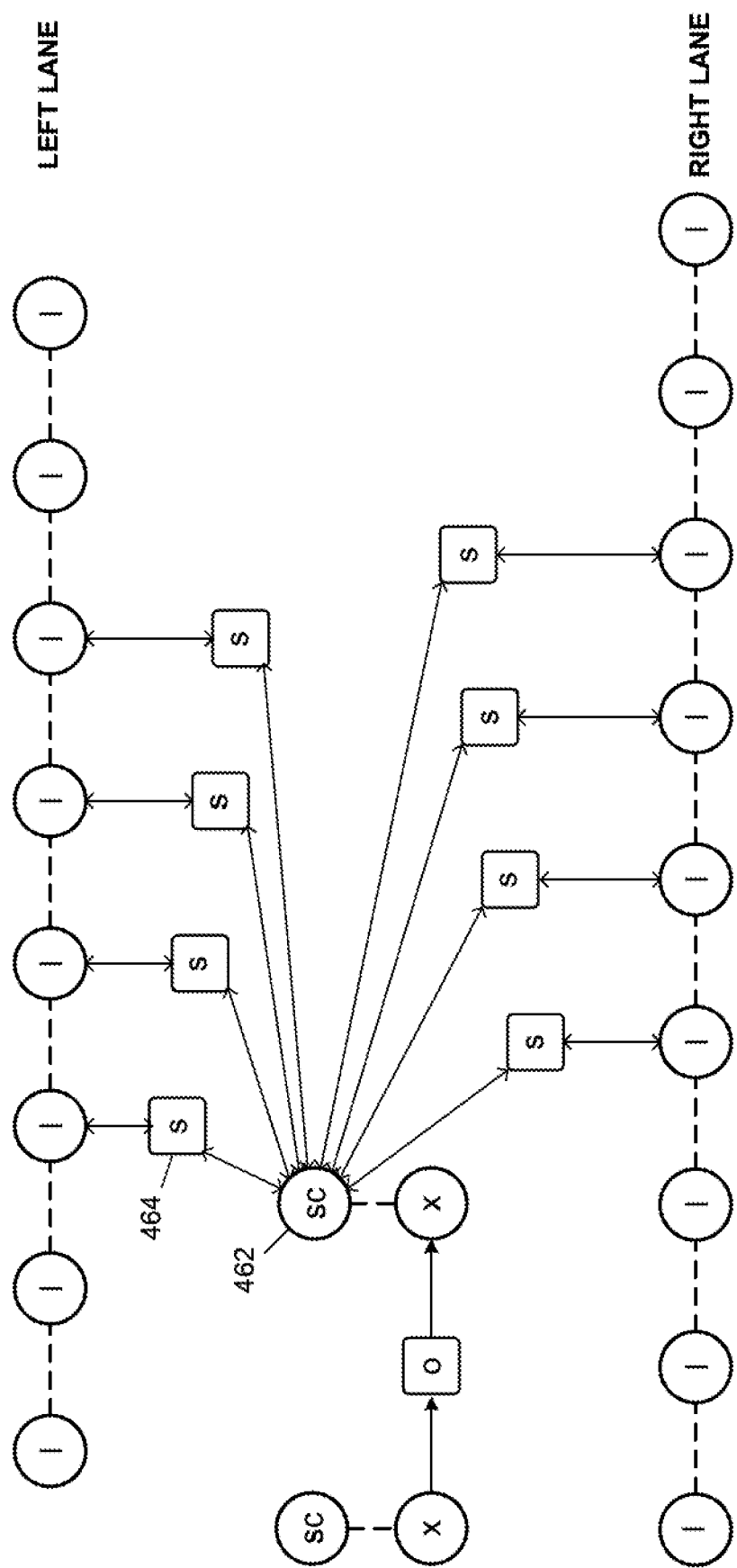

FIG. 5A
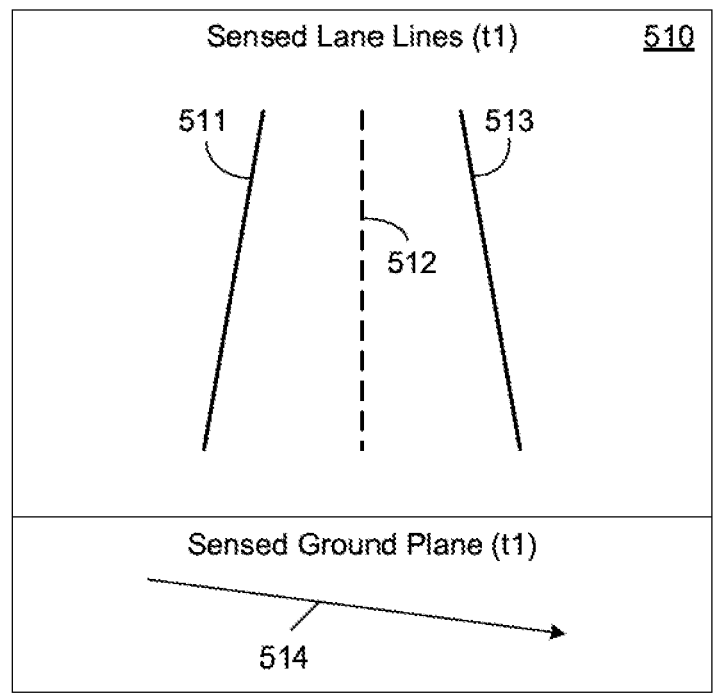
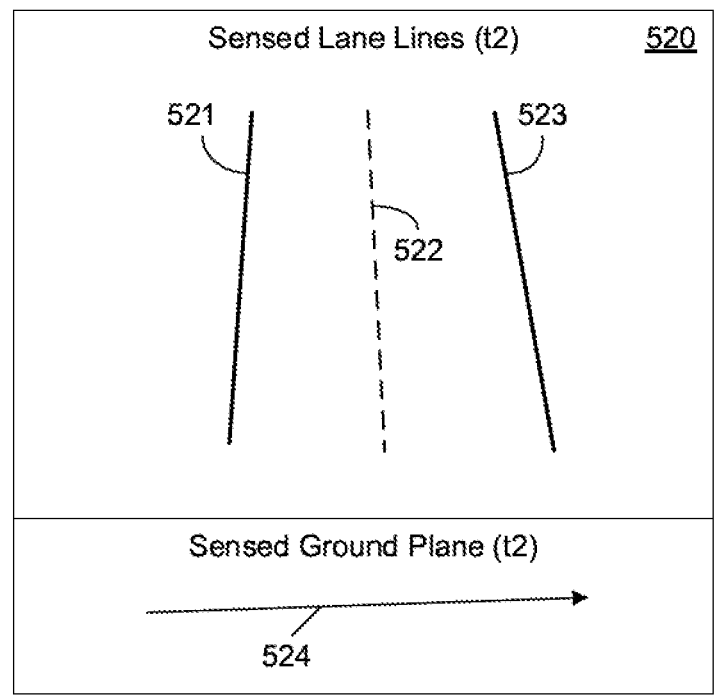

FIG. 5C    550
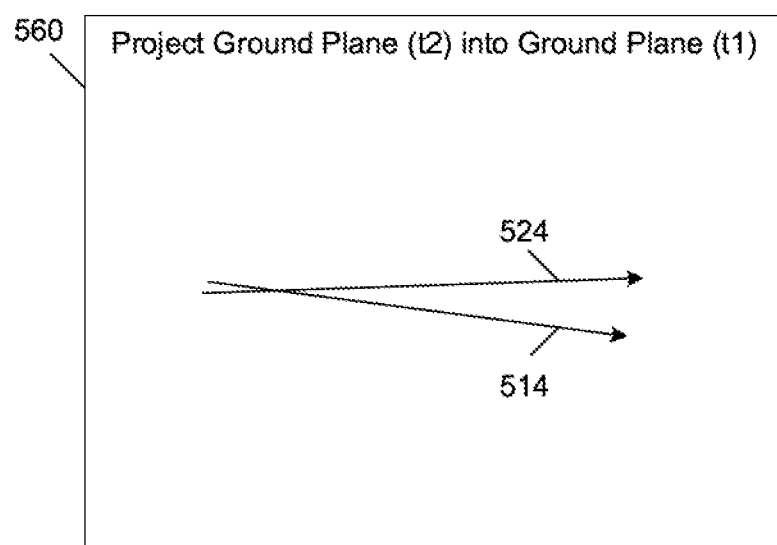

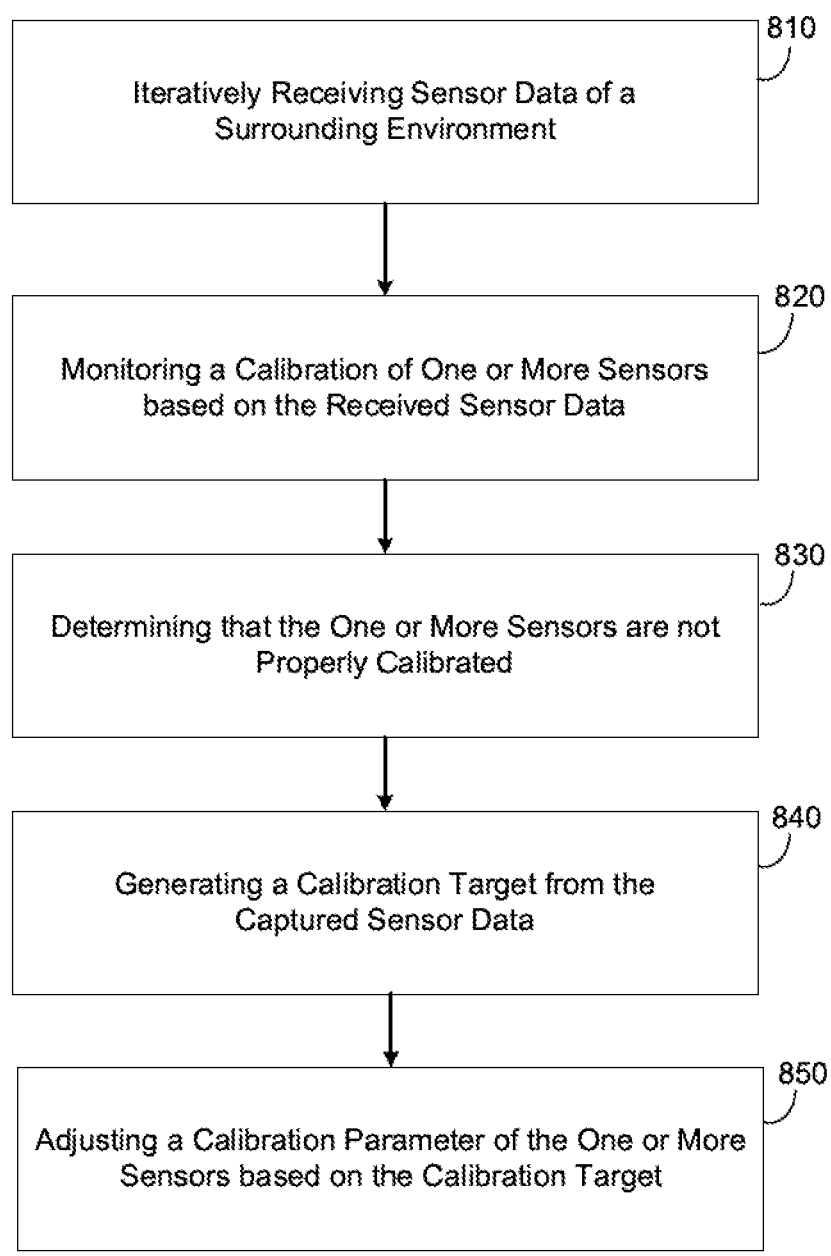

AUTOMATED REAL-TIME CALIBRATION

CROSS-REFERENCE TO RELATED APPLICATIONS

This application is a continuation-in-part of U.S. patent application Ser. No. 17/383,504, filed on Jul. 23, 2021, in the United Stated Patent and Trademark Office, the entire disclosure of which is hereby incorporated by reference for all purposes.

BACKGROUND

An autonomous vehicle relies on sensors such as cameras, lidars, radars, inertial measurement units (IMUs), and the like, to understand the road and the rest of the world around the vehicle without requiring user interaction. Sensor calibration informs the vehicle's computer about the positioning and the orientation of the sensors on the vehicle within a high degree of accuracy. This allows the vehicle to understand its position within the world by bringing the sensor readings into a common coordinate frame. Accurate calibration can be critical for localization, perception (computer vision), control, mapping, and the like. Without proper calibration, an autonomous vehicle will have trouble staying within its lane as well as additional problems such as steering and object recognition.

A typical vehicle calibration process is performed while the vehicle is perched on a rotating substrate within a room filled with targets. In this case, the rotating substrate is usually surrounded by calibration targets (e.g., paperboard cutouts, etc.) arranged in such a way that they cover the field of view of the camera(s) and the lidars of the vehicle. As the substrate turns (as well as the vehicle on top of it), the onboard software system of the vehicle scans the exterior paperboard targets and calibrates its sensors. However, this process is only capable of being performed while the vehicle is parked and rotating on a substrate within a room that has been filled with targets. Furthermore, once calibrated, the vehicle is taken off the rotating substrate and deployed on the road. If, however, the calibration of the vehicle subsequently deteriorates, the vehicle must be shut down and taken off the road so that the vehicle can be returned to the rotating substrate for additional calibration.

SUMMARY

The example embodiments overcome the drawbacks of the traditional calibration process by detecting whether sensors (e.g., lidar sensors, cameras, radar, etc.) of a vehicle are properly calibrated and if not, dynamically initiate a calibration process without taking the vehicle off the road and without having to tow the vehicle to a rotating substrate. In some cases, the calibration may be performed while the vehicle is still travelling down the road and in motion. To perform the calibration, the vehicle may build a calibration target from an object in or around the road that is captured by the sensor data (e.g., in front of the vehicle) while the vehicle is in motion and use this dynamically created calibration target to calibrate the sensors on the vehicle.

For example, lidar sensors, cameras, and other equipment may capture line lane data or other object data in and around the road on which a vehicle is travelling and build the calibration target based on such sensed data. The calibration target may be a three-dimensional model. Furthermore, the vehicle may perform calibration (e.g., alignment, etc.) of the sensors using the multi-dimensional calibration target according to certain embodiments. In this way, both the construction of the calibration target and the calibration based on the calibration target can be performed at the same time, using the same interval of sensor data.

Some of the benefits of the example embodiments include the ability to detect when a vehicle has become improperly calibrated in real-time (e.g., by continuous monitoring, etc.) and calibrate the vehicle in a minute or two, without the vehicle being shut down and removed from the road. Instead, the system described herein can build a calibration target from sensor data (e.g., lidar data, etc.) that is sensed while the vehicle is driving down the road, and the vehicle's computer can calibrate the sensors of the vehicle (e.g., translation, rotation, etc.) based on the built calibration target from these extrinsic sensor readings. The benefit is that the autonomous vehicle stays active and operating without being shut down and losing time away from its job.

According to an aspect of an example embodiment, provided is a vehicle that may include a plurality of sensors configured to iteratively capture sensor data associated with a road while the vehicle is travelling on the road, and a processor that may be configured to monitor a calibration of the one or more sensors of the vehicle based on the iteratively captured sensor data, determine that the one or more sensors of the vehicle are not calibrated properly based on the monitoring, generate a calibration target of an object on the road based on the iteratively captured sensor data, and adjust a calibration parameter of the one or more sensors of the vehicle based on the generated calibration target.

According to an aspect of another example embodiment, provided is a method that may include iteratively capturing, via a plurality of sensors of a vehicle, sensor data associated with a road while the vehicle is travelling on the road, monitoring a calibration of the one or more sensors of the vehicle based on the iteratively captured sensor data, determining that the one or more sensors of the vehicle are not calibrated properly based on the monitoring, generating a calibration target of an object on the road based on the iteratively captured sensor data, and adjusting a calibration parameter of the one or more sensors of the vehicle based on the generated calibration target.

According to an aspect of another example embodiment, provided is a computing system that may include a network interface configured to receive sensor data associated with a road captured by one or more sensors of a vehicle while the vehicle is travelling on the road, and a processor configured to monitor a calibration of the one or more sensors of the vehicle based on the received sensor data, determine that the one or more sensors are not calibrated properly based on the monitoring, generate a calibration target of an object on the road based on the received sensor data, and adjust a calibration parameter of the one or more sensors of the vehicle based on the generated calibration target.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is a diagram illustrating a monitoring system for monitoring and adjusting the calibration of sensors of a vehicle in accordance with example embodiments.

FIGS. 4A-4E are diagrams illustrating a factor graph of transformed data of a vehicle in accordance with an example embodiment.

FIGS. 5A-5C are diagrams illustrating a process of determining whether sensors are properly calibrated in accordance with example embodiments.

FIG. 8 is a diagram illustrating a method of detecting a lack of proper calibration in a vehicle and dynamically calibrating the vehicle while in the vehicle is in motion in accordance with example embodiments.

Figure 1:
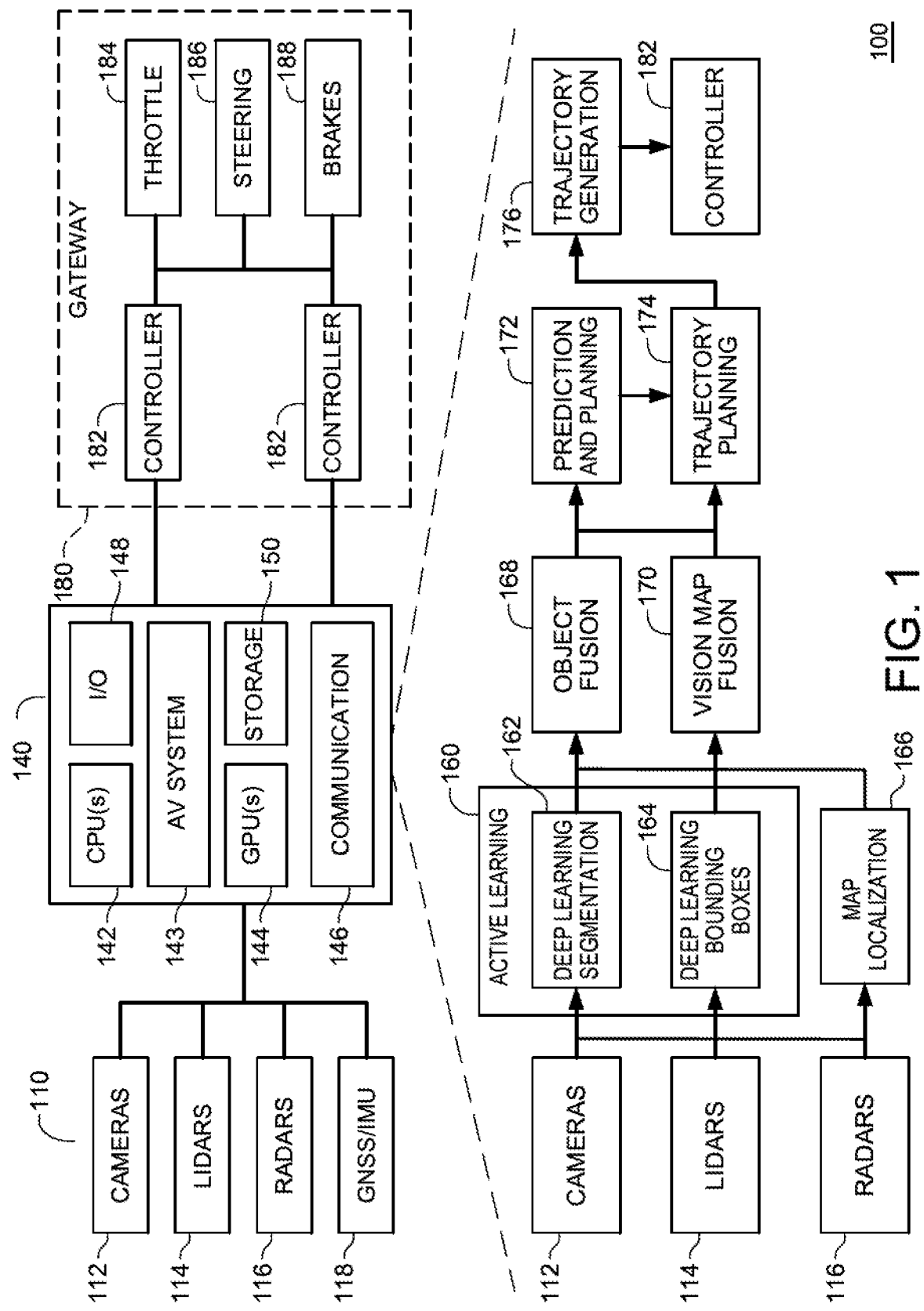
FIG. 1 is a diagram illustrating a control system that may be deployed in a vehicle such as the semi-truck depicted in FIGS. 2A-2C, in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

For convenience and ease of exposition, a number of terms will be used herein. For example, the term "semi-truck" will be used to refer to a vehicle in which systems of the example embodiments may be used. The terms "semi-truck", "truck", "tractor", "vehicle" and "semi" may be used interchangeably herein. It should also be appreciated that the example embodiments are not limited to autonomous semi-trucks, but rather, all types of vehicles, trucks, vans, motor-cycles, and the like, which may travel along a road.

Light detection and ranging (lidar) sensors are used by vehicles to measure a surrounding area by obtaining a sparse point cloud using distances to points in the point cloud that are measured by light beams from the lidar sensors. The illumination works independently from ambient light and can be used in any conditions. Furthermore, the lidar sensors can capture data that can be used to generate a map of the world in three-dimensions (3D). Radio detection and ranging (radar) sensors are used by vehicles to identify objects and other obstacles around the vehicle. The radar sensors may emit electromagnetic waves that reflect (and return reflected waves) when they meet the obstacle. Meanwhile, vehicle cameras can capture images (e.g., RGB images, black and white images, etc.) of the world around the vehicle and provide complimentary data to the lidar data captured by the lidar sensors. For example, cameras can capture data such as color, texture, appearance, etc., while lidar is able to capture and model structural aspects of the data. The lidar sensors, radar sensors, and cameras are exemplary sensors in a vehicle as described herein such as an autonomous vehicle (AV).

Understanding the precise position and orientation of sensors on an autonomous vehicle can be difficult. In many cases, the vehicle has imaging sensors such as lidar, camera, and the like, with different coordinate systems. External calibration may be performed on the sensors to obtain parameters that define a relationship between two coordinate systems such as between the lidar coordinate system and the camera coordinate system. Proper calibration is fundamental for any algorithm that relies on sensor data in the vehicle including mapping a localization services, object tracking services, ego estimation (e.g., odometry), and the like. In the event that a sensor is misaligned, the sensor should be calibrated to prevent any mishaps or accidents from occurring. However, it can be easy to confuse bad calibrations with bad sensor data, poorly performing algorithms, issues with system design, and the like. To determine the issue typically requires a technician to inspect the vehicle and run diagnostics until a decision can be made.

In many vehicles, the perception of the vehicle is created based on a combination (i.e., jointly) of lidar data from the lidar sensors and image data captured by the cameras. For accurate perception, these two systems must be aligned with respect to each other. Lidar calibration according to an exemplary embodiment can be performed to align a coordinate frame of a lidar sensor(s) with a coordinate frame of a camera by changing extrinsic parameters such as rotation and translation between the coordinate frames of the lidar sensor and the camera. These extrinsic parameters can be used to fuse information together from the lidar sensors and the image sensors when visualizing the vehicle interprets visual data from the road.

Traditionally, the calibration of lidar and cameras may be performed by a technician manually moving targets around a vehicle. Another traditional calibration technique is for a user to place targets around a track and have the vehicle drive around the track while capturing pictures of the targets. A more sophisticated calibration setup would rely on parking the vehicle on a rotating substrate within a room filled with targets and turning the substrate while the sensors of the vehicle capturing images/lidar of the various targets within the room. The targets, in this case, are often black/white checkerboards or other predefined shapes such as diamonds, triangles, circles, V-shapes, or even ordinary boxes. The readings of the targets can then be used to calibrate the image plane of the cameras and/or the sensor plane of the lidar sensors. Such a calibration may involve changing the orientation, position, etc., of the cameras and/or the lidar sensors.

The example embodiments are directed to a system and method that overcome the drawbacks of the traditional calibration process by detecting calibration information of a vehicle while the vehicle is in operation, and if necessary, taking the steps to calibrate the vehicle using road data obtained while the vehicle is in motion. For example, if the system detects one or more sensors (e.g., lidar sensors, cameras, radar, etc.) of the vehicle are not properly calibrated, a calibration can be performed in real-time without taking the vehicle out of commission/service. The system may iteratively monitor sensor data captured of an object in the road (e.g., one or more lane lines, etc.) by the sensors in a repetitive manner (e.g., every one meter, two meters, three meters, etc.) and determine a calibration state of the sensors by comparing changes in the sensed location of the object in the road. The system may use image segmentation, cost functions, additional models, and the like, to determine how accurate the level of calibration is for the different sensors. If one or more of the sensors are determined to be improperly calibrated, the vehicle may dynamically initiate a calibration process while the vehicle is still travelling down the road.

The calibration process may be performed based on an internal calibration target that is generated by the vehicle of the road on which the vehicle is travelling instead of paperboard targets of random shapes and sizes. The vehicle can capture sensor data (e.g., images, lidar, etc.) while in movement on a road and use the sensor data to construct a calibration target of the road surface. The calibration target can include one or more of the lane lines that can be parameterized as one or more polylines (e.g., one polyline per lane). Each polyline may include a sequence of points describing a line. The calibration target can also include a road surface formed by connecting the lane line points with triangles. The calibration target may be saved as a .CSV file, a .JSON file, or the like. For example, the vehicle may construct a 3D map of the lanes (lane lines) on the road based on the lidar data from the lidar sensors and store the map within a .CSV file within a memory of the vehicle's computer. Next, the vehicle may calibrate either of the lidar sensors and/or the cameras with respect to each other based on the 3D map of the lane lines. For example, a translation and a rotation of the lidar sensors and/or the cameras can be modified to align in a common 3D image plane of the vehicle's perception.

Figure 2A:
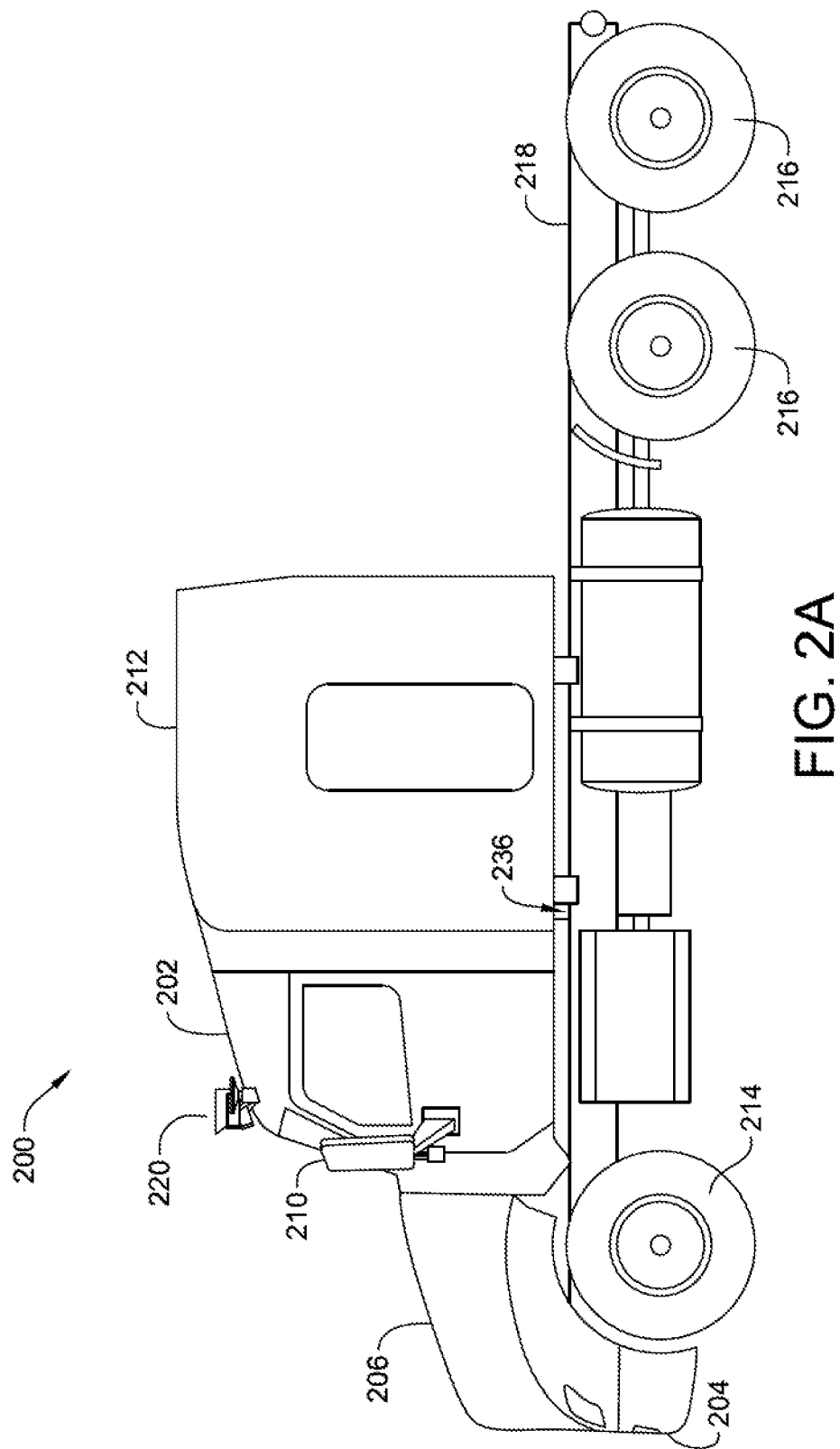
FIGS. 2A-2C are diagrams illustrating exterior views of a semi-truck that may be used in accordance with example embodiments.
Figure 2B:
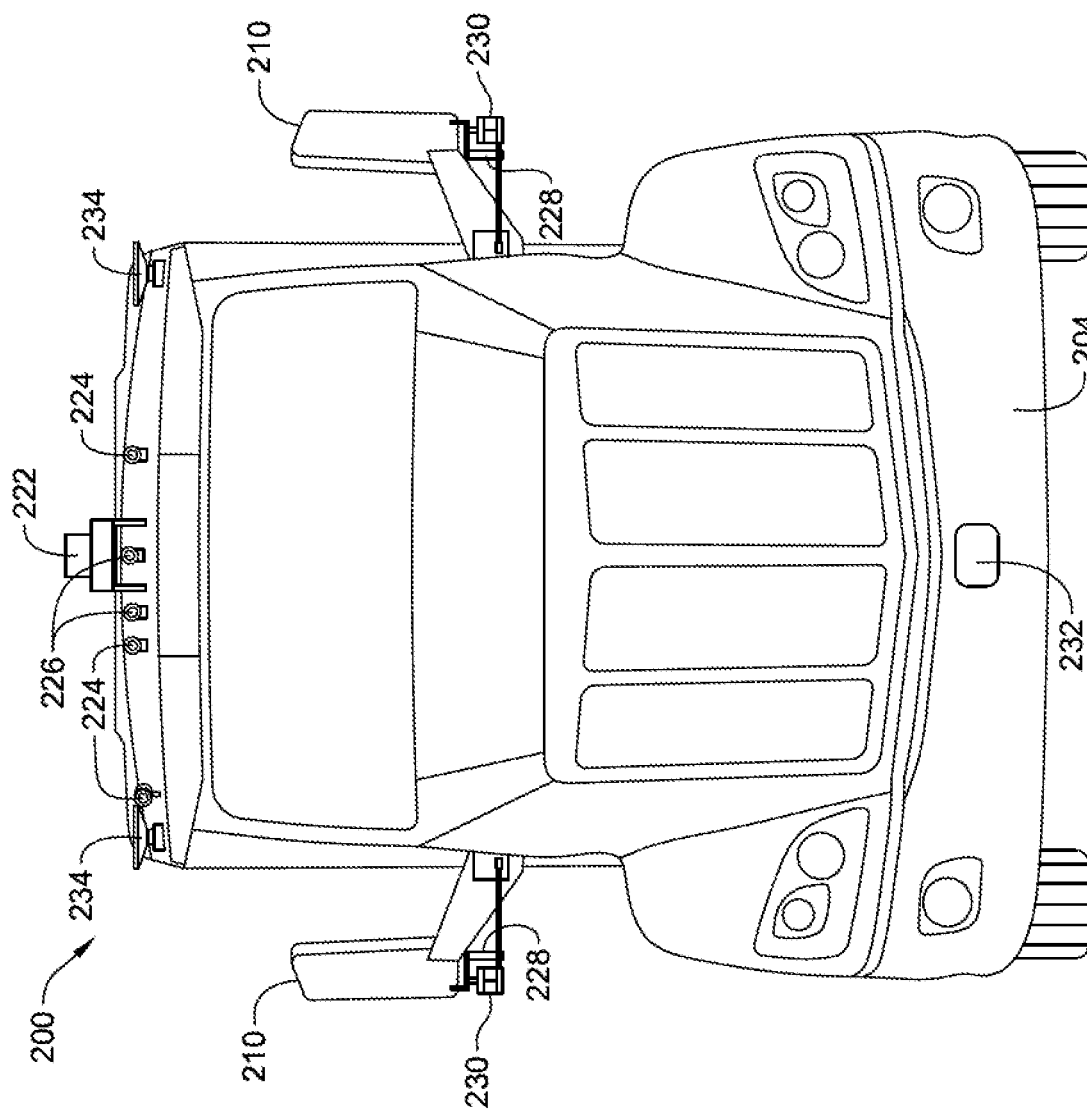
Figure 2C:
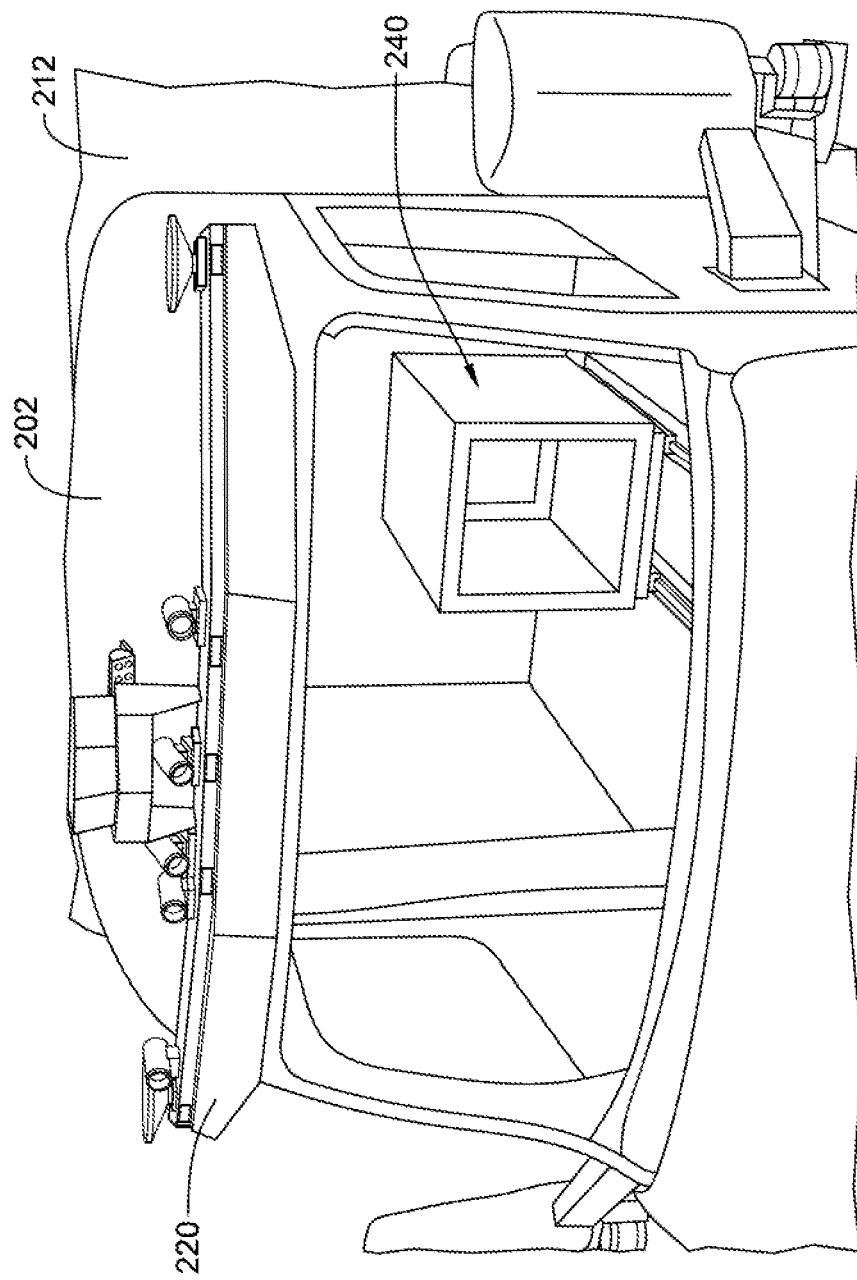

FIG. 1 illustrates a control system 100 that may be deployed in a vehicle such as the semi-truck 200 depicted in FIGS. 2A-2C, in accordance with an example embodiment. Referring to FIG. 1, the control system 100 may include a number of sensors 110 which collect data and information provided to a computer system 140 to perform operations including, for example, control operations which control components of the vehicle via a gateway 180. Pursuant to some embodiments, the gateway 180 is configured to allow the computer system 140 to control a number of different components from different manufacturers.

The computer system 140 may be configured with one or more central processing units (CPUs) 142 to perform processing including processing to implement features of embodiments of the present invention as described elsewhere herein as well as to receive sensor data from sensors 110 for use in generating control signals to control one or more actuators or other controllers associated with systems of the vehicle (including, for example, actuators or controllers allowing control of a throttle 184, steering systems 186, brakes 188 or the like). In general, the control system 100 may be configured to operate the semi-truck 200 in an autonomous (or semi-autonomous) mode of operation. In some embodiments, the computer system 140 may include an AV system 143 for controlling the system that is further described herein with respect to FIGS. 3, 4, 5A-5C, and 6. For example, the AV system 143 may be installed within the computer system 140.

In operation, the control system 100 may be operated to capture images from one or more cameras 112 mounted on various locations of the semi-truck 200 and perform processing (such as image processing) on those images to identify objects proximate or in a path of the semi-truck 200.

Further, lidar 114 and radar 116 may be positioned to sense or detect the presence and volume of objects proximate or in the path of the semi-truck 200. Other sensors may also be positioned or mounted on various locations of the semi-truck 200 to capture other information such as position data. For example, the sensors may include one or more satellite positioning sensors and/or inertial navigation systems such as GNSS/IMU sensors 118. A Global Navigation Satellite System (GNSS) is a space-based system of satellites that provide the location information (longitude, latitude, altitude) and time information in all weather conditions, anywhere on or near the Earth to devices called GNSS receivers. GPS is the world's most used GNSS system. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU sensors 118 may be used in conjunction with features of the present invention. The data collected by each of these sensors may be processed by the computer system 140 to generate control signals that control the operation of the semi-truck 200. The images and location information may be processed to identify or detect objects around or in the path of the semi-truck 200 and control signals may be emitted to adjust the throttle 184, steering 186 or brakes 188 as needed to safely operate the semi-truck 200. While illustrative example sensors and actuators or vehicle systems are shown in FIG. 1, those skilled in the art, upon reading the present disclosure, will appreciate that other sensors, actuators or systems may also be used. For example, in some embodiments, actuators to allow control of the transmission of the semi-truck 200 may also be provided.

The control system 100 may include a computer system 140 (such as a computer server) which is configured to provide a computing environment in which one or more software or control applications (such as items 160-182) may be executed to perform the processing described herein. In some embodiments, the computer system 140 includes components which are deployed on a semi-truck 200 (e.g., they may be deployed in a systems rack 240 positioned within a sleeper compartment 212 as shown in FIG. 2C). The computer system 140 may be in communication with other computer systems (not shown) that may be remote from the semi-truck 200 (e.g., the computer systems may be in communication via a network connection).

In some examples, the computer system 140 may be implemented as a server. Furthermore, the computer system 140 may configured using any of a number of well-known computing systems, environments, and/or configurations such as, but not limited to, personal computer systems, cloud platforms, server computer systems, thin clients, thick clients, hand-held or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like.

A number of different software applications or components may be executed by the computer system 140 and the control system 100. For example, as shown, applications may be provided which perform active learning machine processing (active learning component 160) to process images captured by one or more cameras 112 and information obtained by lidar 114. For example, image data may be processed using deep learning segmentation models 162 to identify objects of interest in those images (such as, for example, other vehicles, construction signs, etc.). Lidar data may be processed by the machine learning applications 164 to draw or identify bounding boxes on image data to identify objects of interest located by the lidar sensors. Information output from the machine learning applications may be provided as inputs to object fusion 168 and vision map fusion 170 software components which may perform processing to predict the actions of other road users and to fuse local vehicle poses with global map geometry in real-time, enabling on-the-fly map corrections. The outputs from the machine learning applications may be supplemented with information from radar 116 and map localization 166 application data (as well as with positioning data). These applications allow the control system 100 to be less map reliant and more capable of handling a constantly changing road environment. Further, by correcting any map errors on the fly, the control system 100 can facilitate safer, more scalable and more efficient operations as compared to alternative map-centric approaches. Information is provided to prediction and planning application 172 which provides input to trajectory planning 174 components allowing a trajectory 176 to be generated in real time based on interactions and predicted interactions between the semi-truck 200 and other relevant vehicles in the environment. In some embodiments, for example, the control system 100 generates a sixty second planning horizon, analyzing relevant actors and available trajectories. The plan that best fits multiple criteria (including safety, comfort and route preferences) is selected and any relevant control inputs needed to implement the plan are provided to controllers 182 to control the movement of the semi-truck 200.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 1 illustrates an example computer system 140 which may represent or be integrated in any of the above-described components, etc. FIG. 1 is not intended to suggest any limitation as to the scope of use or functionality of embodiments of the application described herein. The computer system 140 is capable of being implemented and/or performing any of the functionality set forth hereinabove.

The computer system 140 may be described in the general context of computer system-executable instructions, such as program modules, being executed by a computer system. Generally, program modules may include routines, programs, objects, components, logic, data structures, and so on that perform particular tasks or implement particular abstract data types. The computer system 140 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 140 is shown in the form of a general-purpose computing device. The components of the computer system 140 may include, but are not limited to, one or more processors (such as CPUs 142 and GPUs 144), a communication interface 146, one or more input/output interfaces 148 and the storage device 216. Although not shown, the computer system 140 may also include a system bus that couples various system components including system memory to the CPUs 142. In some embodiments, the input/output interfaces 148 may also include a network interface. For example, in some embodiments, some or all of the components of the control system 100 may be in communication via a controller area network ("CAN") bus or the like.

The storage device 150 may include a variety of types and forms of computer readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random-access memory (RAM) and/or cache memory. As another example, storage device 150 can read and write to a non-removable, non-volatile magnetic media (not shown and typically called a "hard drive"). Although not shown, the storage device 150 may include one or more removable non-volatile disk drives such as magnetic, tape or optical disk drives. In such instances, each can be connected to the bus by one or more data media interfaces. Storage device 150 may include at least one program product having a set (e.g., at least one) of program modules that are configured to carry out the functions of various embodiments of the application.

FIGS. 2A-2C are diagrams illustrating exterior views of a semi-truck 200 that may be used in accordance with example embodiments. Referring to FIGS. 2A-2C, the semi-truck 200 is shown for illustrative purposes only—those skilled in the art, upon reading the present disclosure, will appreciate that embodiments may be used in conjunction with a number of different types of vehicles. The example semi-truck 200 shown in FIGS. 2A-2C is one configured in a common North American style which has an engine 206 forward of a cab 202, a steering axle 214 and drive axles 216. A trailer (not shown) is attached to the semi-truck 200 via a fifth-wheel trailer coupling that is provided on a frame 218 positioned over the drive axles 216. A sleeper compartment 212 is positioned behind the cab 202. A number of sensors are positioned on different locations of the semi-truck 200. For example, sensors may be mounted on a roof of the cab 202 on a sensor rack 220. Sensors may also be mounted on side mirrors 210 as well as other locations. As will be discussed, sensors may be mounted on the bumper 204 as well as on the side of the cab 202 or other locations. For example, a rear facing radar 236 is shown as mounted on a side of the cab 202 in FIG. 2A.

Embodiments may be used with other configurations of trucks or other vehicles (e.g., such as semi-trucks having a cab over or cab forward configuration or the like). In general, and without limiting embodiments of the present invention, features of the present invention may be used with desirable results in vehicles that carry cargo over long distances, such as long-haul semi-truck routes.

FIG. 2B is a front view of the semi-truck 200 and illustrates a number of sensors and sensor locations. The sensor rack 220 may secure and position several sensors including a long range lidar 222, long range cameras 224, GPS antennas 234, and mid-range front facing cameras 226. The side mirrors 210 may provide mounting locations for rear-facing cameras 228 and mid-range lidar 230. A front radar 232 may be mounted on the bumper 204. Other sensors may be mounted or installed on other locations—the locations and mounts depicted in FIGS. 2A-2C are for illustrative purposes only. Referring now to FIG. 2C, a partial view of the semi-truck 200 is shown which shows an interior of the cab 202 and the sleeper compartment 212. In some embodiments, portions of the control system 100 of FIG. 1 are deployed in a systems rack 240 in the sleeper compartment 212, allowing easy access to components of the control system 100 for maintenance and operation.

FIG. 3 illustrates a process 300 of a monitoring system 320 monitoring and adjusting the calibration of sensors of a vehicle in accordance with example embodiments. For example, the monitoring system 320 may be implemented within a computer of the vehicle. As another example, the monitoring system 320 may be included in a mobile device, a remote server, or the like. Referring to FIG. 3, the monitoring system 320 is monitoring a plurality of sensors including lidar sensors 311, 312, and 313, and cameras 314 and 315. In this example, a plurality of monitoring modules 321, 322, 323, 324, and 325 are implemented within the monitoring system 320. In this example, the monitoring system 320 initiates/scales the number of monitoring modules 321-325 such that each sensor includes its own dedicated monitoring module, respectively.

The monitoring modules 321-325 may simultaneously monitor the performance of the different sensors including the lidar sensors 311, 312, and 313, and the cameras 314 and 315. For example, every predetermined period of time (e.g., every 0.5 seconds, 1 second, 2 seconds, 3 seconds, etc.) the lidar sensors 311, 312, and 313 and the cameras 314 and 315 may capture data of the road. The data may be captured in and around the vehicle including in front of the vehicle, behind the vehicle, to the side of the vehicle, under the vehicle, and the like. Each time a new sensor reading is captured by the lidar sensors 311, 312, and 313, and the cameras 314 and 315, the monitoring modules 321-325 may analyze the readings to determine whether the calibration is still acceptable or it has deteriorated below a predetermined threshold of misalignment. In other words, the monitoring modules 321-325 may monitor the quality of the calibration (QoC) of the different sensors. The threshold or thresholds for proper alignment may be set via default or it may be set by a user or other developer via a user interface (not shown).

The monitoring system 320 may determine an aggregated state 326 of all sensors 311-315 combined based on the monitoring performed by the monitoring modules 321-325. If any of the sensors are determined to be misaligned (lacking proper calibration), the monitoring system 320 may determine to calibrate the vehicle in real-time. In this example, the monitoring system 320 can take different actions including an action 331 which continues to allow the vehicle to operate without any changes. This action may be determined if the aggregated state 326 does not have any sensors out of calibration. Another action 332 attempts to calibrate the vehicle in real-time. This action may be determined if one or more of the sensors lack proper calibration. Another action 333 prevents the vehicle from continuing to drive. This action 333 may be taken if the lack of calibration (i.e., the misalignment) is great enough. For example, the threshold misalignment for preventing driving may require a greater misalignment than the threshold for real-time calibration. Different thresholds of alignment for each of the actions 331, 332, and 333, may be stored in a table or file of the monitoring system 320. Thus, the monitoring system 320 may determine which action to take based on the aggregated state 326 of the lidar sensors 311, 312, and 313, and the cameras 314 and 315, combined.

Figure 4A:
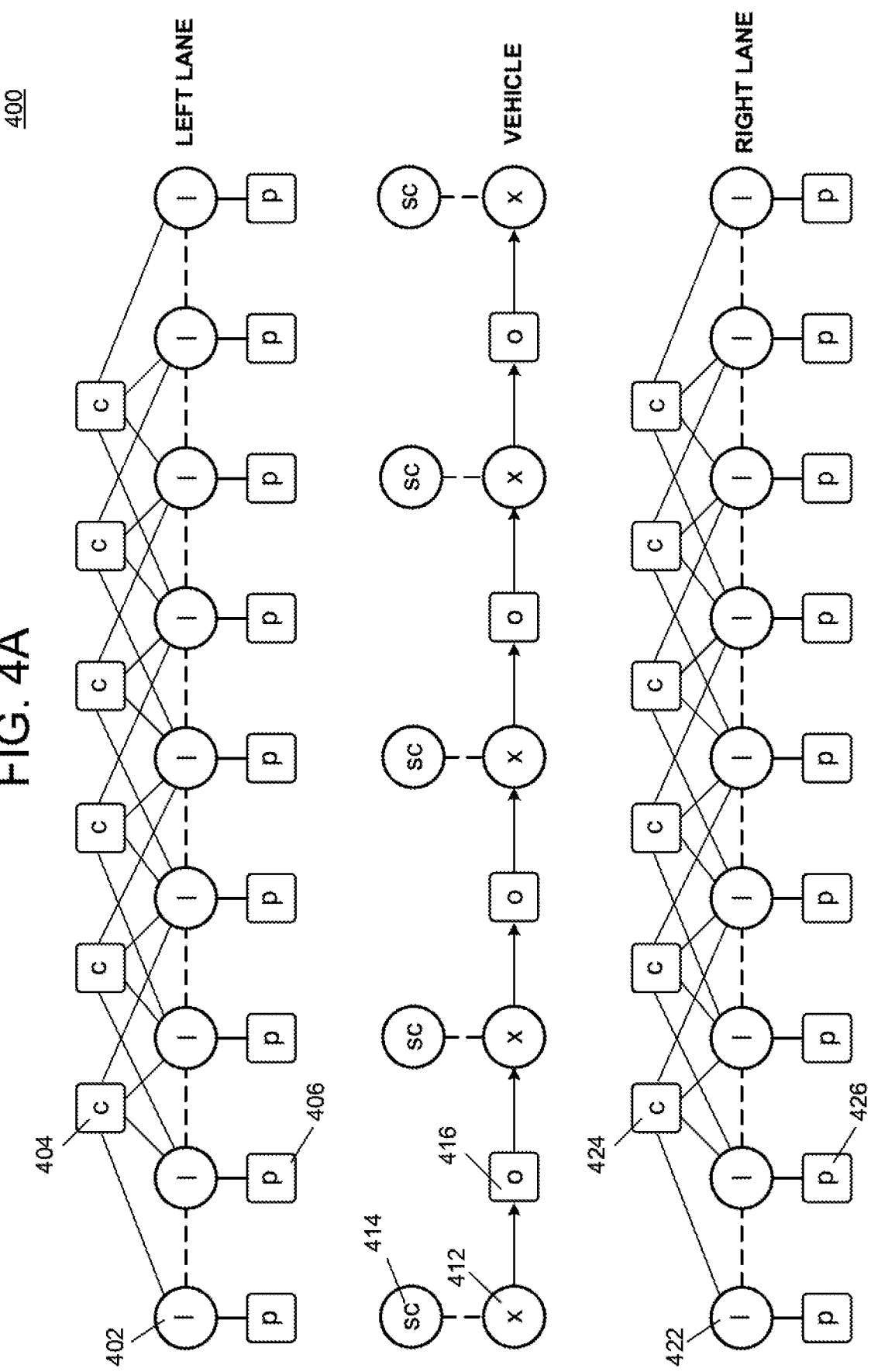

The vehicle described herein may include an algorithm stored in a memory/computer thereof which builds a rolling window factor graph for calibrating both lidars and cameras. An example of a full system calibration factor graph is shown in FIG. 4A. A similar factor graph (not shown) may also be generated for lidar monitoring but the factors may be less than in the full system calibration factor graph shown in FIG. 4A. For example, for the lidar monitoring, the factor graph may only have a line-to-line factor, a lidar-to-ground plane factor, and a consecutive ground plane to ground plane factor, or the like. For each lidar scan, the system may label lidar points with a machine learned lidar segmentation model. Furthermore, the system may compute a plane fit of ground points locally around the vehicle. The system may detect lines in lane points (e.g., straight collections of points). Furthermore, for each line the system can find nearby (similar) lines in a previous scan and construct a line-to-line factor. The system can also construct a ground plane factor with the locally measured ground plane. In addition, the system may construct a plane-to-plane factor to associate and smooth consecutively measured local ground planes. Furthermore, the system may optimize the factor graph to compute an ideal calibration.

The lidar calibration monitoring may consider locally observed ground planes and locally observed lane line segments. The system may assume that a lidar mounted on the truck should observe a ground plane that matches the XY plane of the vehicle origin (i.e., the plane that contains the x and y axes). The system may also assume that any observed lane line segment in a lidar scan should remain observable in the same world position. Given these assumptions the system can construct two factors including detected ground planes and line-to-line associations. While the truck is in motion, the monitoring system can collect a rolling window of these factors based on the sensed data captured in each frame to solve for the ideal lidar calibration. The detected ground plane factors can reduce or otherwise minimize the distance between the measured ground plane and the vehicle XY plane. As the vehicle drives, the system may attempt to find lane line segments in lidar scans. If a lane line segment is observed in a world location nearby a previously observed lane line from the previous lidar scan, the system can construct a line-to-line factor. The line-to-line factor minimizes the distance and angle between these lines by modifying the lidar calibration. To simplify the problem computationally and to make its solution more stable, the system can also assume the vehicle odometry is perfect and only optimize the calibration of the lidar.

The camera monitoring may be used to determine whether cameras on the vehicle are calibrated properly. During the monitoring process, the system may project semantically labeled lidar points into a stream of camera segmentation images and evaluate how well they align over time. The quality of the alignment may be determined by the system based on semantic labels of the lidar points and camera pixels. These labels may be determined with a machine learned model that performs camera segmentation on the raw camera image, and a machine learned model that performs lidar segmentation on the raw lidar scan.

For each camera, the system may store a rolling buffer of previous lidar scans (a predefined size) and a buffer of odometry messages. For each new image received by the system, the system may project lidar scans (using the stored odometry and calibration values) into the image to compute the alignment cost. The alignment cost may be composed of two metrics, a lane line cost and a road overlap. Here, the lane line cost is the average pixel distance that a projected lidar lane point is from a lane labelled pixel in the segmentation image (this is accelerated with a distance transform of the lane line segmentation image). Meanwhile, the road overlap is the fraction of road labelled lidar points that occur on road labelled pixels in the segmentation image. An exponential moving average filter may be used to smooth the resulting metrics to minimize false positives due to noisy segmentation data or poor odometry. The factors obtained from the lidar monitoring and the camera monitoring may be stored within the nodes of a factor graph as further described in FIG. 4A.

FIG. 4A illustrates a factor graph 400 of transformed data of a vehicle in accordance with an example embodiment. In this context the factor graph 400 can be defined as a graphical model used to describe how the factors in the graph are mathematically setup and interact geometrically with estimated parameters. These factors may be obtained during the lidar monitoring and camera monitoring phases. In this case, the vehicle is estimating the vehicle calibrations. The cost functions are commonly referred to as "factors" in a factor graph. In FIG. 4A, the factors are represented by edges in the factor graph 400. The example embodiments "solve" the factor graph 400 by a method of non-linear optimization of the parameters using the factors to evaluate cost. For example, the vehicle may optimize the factor graph to find the optimal calibrations for the lidar and/or the cameras.

In the example embodiments, the vehicle may miss or otherwise not have a measurement from each sensor for each frame in the factor graph 400. However, the factor graph 400 is flexible and can work even with missing points. For example, the host system may construct nodes that represent the state (e.g., pose, etc.) of the vehicle at a fixed rate (e.g., ~5 Hz, etc.). The lidar measurements and camera measurements may occur at times between the times of these pose nodes. To allow these sensor measurements to be used in the factor graph without exactly matching a time of one the pose nodes, the system may interpolate a new vehicle pose during optimization for the exact timestamp of the measurement. This effectively means that factors which involve camera or lidar measurements may first interpolate the vehicle pose for the relevant time. As the optimization runs the values of each pose node may mutate, which is why the interpolation must be part of the factor and recomputed throughout the optimization.

As an example, the sensors may be triggered to sense data at a predetermined frequency (e.g., 3 hertz, 5 hertz, 10 hertz, etc.). During each iteration of data capture, the lidars and cameras may capture data and create a new entry (set of nodes) in the factor graph 400. The data is essentially "raw" sensor data. It may not be transformed. The sensors may optionally be hardware synchronized such that they acquire data at exactly the same time and rate. In other embodiments the cameras, lidars, and odometry measurements occur at different rates. Subsequently each frame may contain one image/measurement per camera, readings of the individual lidar points between the previous frame time and the current frame time, and odometry readings between the previous frame time and the current frame time. In some embodiments, the vehicle may interpolate between the odometry measurements to find an exact odometry per lidar point time and image time. In some embodiments, the vehicle may capture images from different cameras at different frequencies. In this situation the vehicle may interpolate between factor graph nodes to correctly locate camera images during optimization.

As noted above, the frequency at which the sensor data is captured (i.e., the frequency of the sensor readings) may be based on distance travelled, time elapsed, and/or the like. For example, a new sensor reading may occur every 1 meter, 3 meters, 10 meters, or the like. As another example, the sensor readings may include a reading at 5 hertz (e.g., 5 times a second, etc.), every one second, every two seconds, or the like. In addition to recording the sensor measurements and transforms, the factor graph 400 may also store an odometry value (e.g., the distance traveled) by the vehicle between each of the sensor readings which has a trajectory based on the trajectory of the vehicle.

For example, factors that are stored in the factor graph 400 (at each frame) may include lidar factors such as a lidar lane factor representing the distance between a lidar lane labelled point and a nearest lane boundary segment, a lidar road factor representing a distance between a lidar road labelled point and its nearest road mesh triangle, a local ground plane factor that represents a 3D plane that is fit to the road labelled lidar points immediately around the vehicle (can be used to measure the different between this plane and the local XY plane of the vehicle, etc.) Other factors stored in the factor graph may include camera factors such as a camera SDF which represents a distance lookup for a lane boundary vertex projected into a camera segmentation SDF (signed distance field) of lane segmentation points. This lookup image represents the distance to the nearest lane boundary pixel in the camera segmentation. Another camera factor is the camera calibration prior factor that anchors the calibration to its initialized pose. The virtual road map that is built may also have factors include a lane curvature factor that represents a four-tuple of lane points that evaluates local curvature. This factor ensures that curvature remains constant. A lane prior factor represents a factor per lane boundary vertex that anchors the vehicle to its initialized position. The ego vehicle may also have factors, for example, an odometry factor that measures the difference between two vehicle poses and minimizes any deviation from the measured difference, and a vehicle plane factor that measures the difference between the vehicle XY plane and the nearest road mesh triangle plane.

The different factors (cost functions, etc.) may be executed simultaneously by the vehicle's computer. Some or all of the cost functions may be part of the target building process and/or the calibration process, and enable the vehicle's sensors (e.g., cameras and lidars) to be calibrated while in-motion on the road. For example, the vehicle may consider a change (or delta) in odometry since the previous frame. This makes it expensive to deviate from the recorded change in odometry. So if the truck odometry recorded it moved 1 meter forward and rotated 1 degree to the left between two frames (i.e. the delta), it would be expensive to do otherwise during the optimization. The final cost function may be the camera cost function. This cost function projects lane points into the image and scores how well they align with the pixels that have been labeled as lane lines by the image segmentation.

Referring to FIG. 4A, a vehicle computer may generate the factor graph 400 based on lidar and camera points sensed from the equipment of the vehicle. In this example, the factor graph 400 includes two lane lines which are each represented with a plurality of nodes in the factor graph which are labeled with an identifier of '1' which represents "lane line". Both a left lane line and a right lane line are identified along with a plurality of lane line nodes in each lane line. For example, the left lane line is embodied as a plurality of nodes 402 representing sensed points of the left lane line while the right lane line is embodied as a plurality of nodes 422 representing sensed points of the right lane line. Furthermore, lane curvature factors 404 and 424 labeled with the identifier 'c' are positioned such that they are connected to the lane line nodes 402 and 422, respectively. In addition, prior factors 406 and 426 which are labeled with the identifier 'p' are positioned at the lane line nodes 402 and 422, respectively. The lane curvature factors 404 and 424 provide a cost function for lane curvature and the prior factors 406 and 426 provide prior factors of previous nodes in the factor graph 400.

Furthermore, the ego vehicle in this example is travelling in between the two lane lines. The trajectory of the ego vehicle is represented by a sequence of nodes 412 in the factor graph 400. In between each pair of trajectory nodes 412 is an odometry factor 416 labeled with an 'o' and representing a cost function to be applied to an odometry reading. The factors and the nodes enable the system to perform calibrations on the lidar and camera sensors of the vehicle.

Figure 4B:
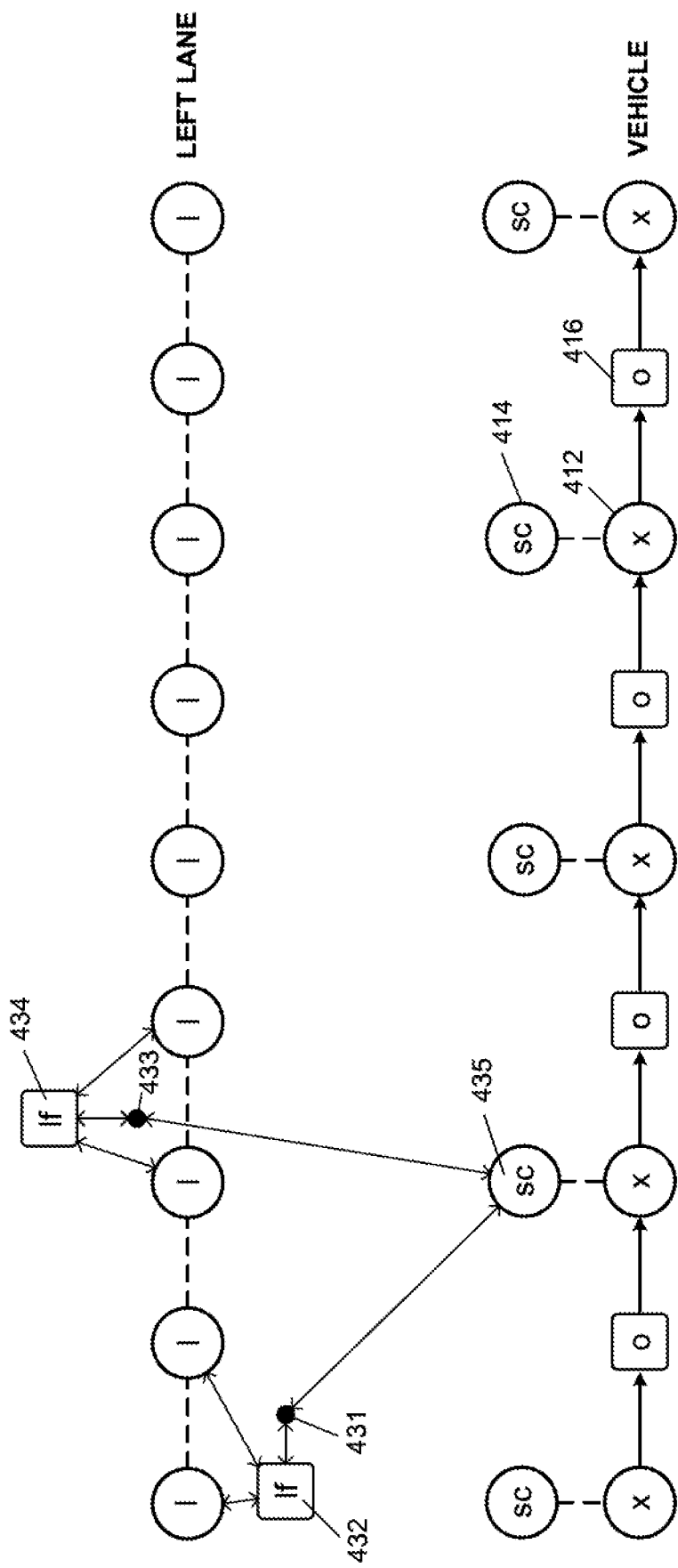

FIG. 4B illustrates a process 430 of constructing a lidar point to lane line factor for a sensor calibration 435 according to example embodiments. In this example, only the left lane line and the vehicle trajectory are shown. Referring to FIG. 4B, when a lidar point (e.g., lidar points 431 and 433), etc.) is associated with a lane line (e.g., based on distance to the lane line, etc.) a lidar point to lane line factor can be constructed (e.g., lidar point to lane line factors 433 and 434, etc.) which can be used to calibrate a sensor represented by node 435 in the factor graph. This factor takes two lane points to form a segment. It measures the perpendicular distance between the point and the lane segment. It depends on the vehicle state and the calibration. In an advanced configuration, it depends on the previous and next vehicle state, and interpolates the required vehicle state based on the ratio of time the lidar point was captured between the two.

Figure 4C:
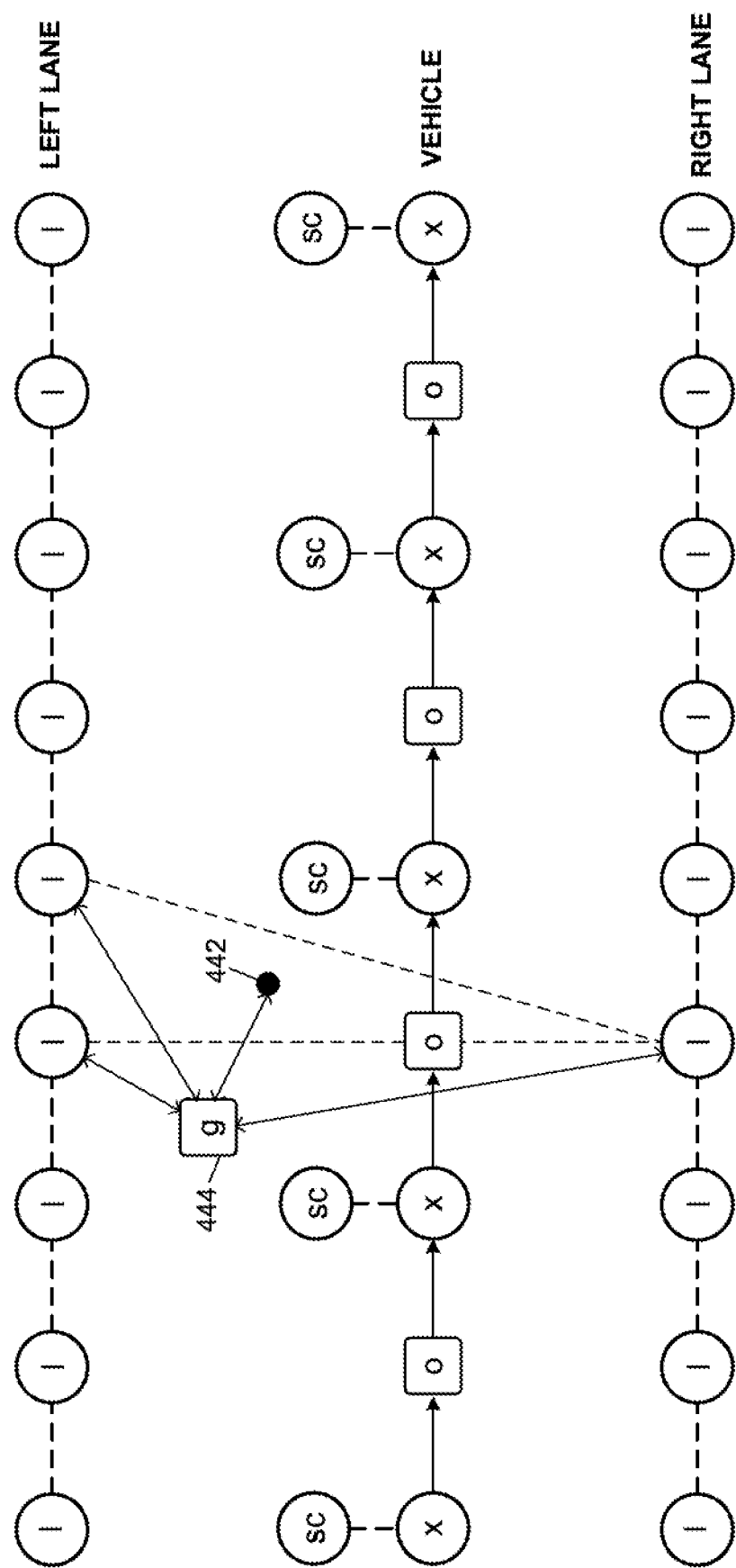

FIG. 4C illustrates a process 440 of constructing a lidar road factor based on a sensed lidar point 442. In this example, the vehicle may label the lidar point 442 as a road point based on a predefined method. A lidar point labelled as road can be used to form a lidar road factor 444. For example, the lidar point 442 may first be associated with a nearest triangle formed by the tessellation of the lane lines as noted by the broken lines forming the triangle between the left lane and the right lane in FIG. 4C. The factor 444 can measure the perpendicular distance between the lidar point 442 and the plane formed by the triangle. The factor 444 depends on the vehicle state and the calibration. In an advanced configuration, it depends on the previous and next vehicle state, and interpolates the required vehicle state based on the ratio of time the lidar point was captured between the two.

FIG. 4D illustrates a process 450 of constructing a vehicle to road factor. Referring to FIG. 4D, a vehicle pose (x) can be associated to a road mesh triangle 454 which is formed by three lane points from two lane lines creating a triangle. A factor can be created from this association. The vehicle to road factor measures the distance between the three points that form the road plane to the XY plane formed by the vehicle pose. It depends on the vehicle state and the lane points.

FIG. 4E illustrates a process 460 of constructing a camera SDF factor. Referring to FIG. 4E, a camera frame can observe lane lines. By projecting virtual lane lines into the camera frame, the system/vehicle can compute closeness to observed lane lines (accelerated with a distance transform SDF). In this example, a camera represented by node 462 can be calibrated based on camera SDF factors 464 which are constructed for each lane point within view of a camera frame of the node 462 (the camera). The factor 464 can depend on the vehicle state and the calibration. In an advanced configuration, it can depend on the previous and next vehicle state, and interpolates the required vehicle state based on the ratio of time the camera image was captured between the two.

Figure 5B:
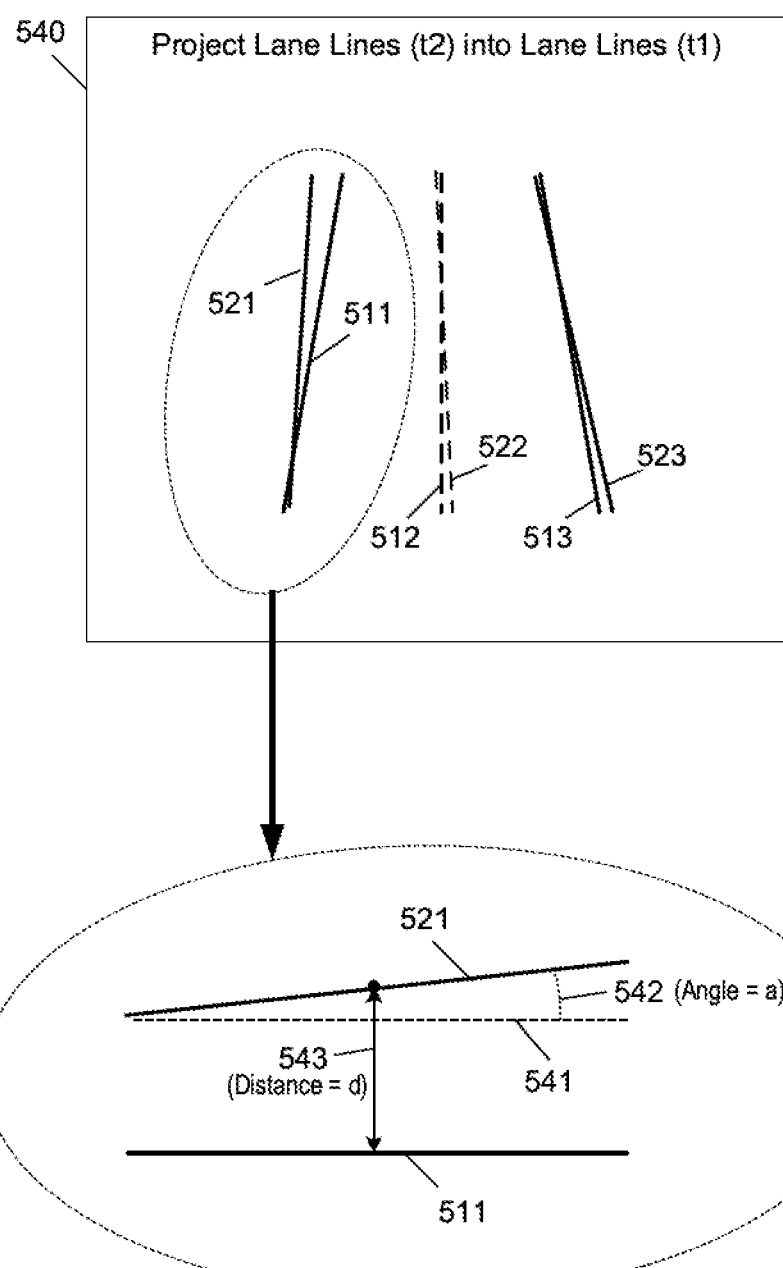

FIGS. 5A-5C are diagrams illustrating a process of determining whether sensors are properly calibrated in accordance with example embodiments. The vehicle may iteratively/repeatedly capture images via sensors on the vehicle. In the examples herein, only two images or sensor readings are shown for ease of convenience, but it should be appreciated that more than two readings may be captured and analyzed, such as a sliding window of images based on time.

For example, FIG. 5A illustrates a process 500 of capturing two lidar images of a road in front of a vehicle while the vehicle is in motion along the road. In this example, a first sensor reading 510 is captured at a first point in time (i.e., t1) and includes lane lines 511, 512, and 513 within the content of the image. In addition, the first sensor reading 510 includes a ground plane estimate 514 which in the drawing is shown as a line, but may be a three-dimensional model of the shape and angle of the ground around the vehicle at the time of the first sensor reading.

In addition, FIG. 5A illustrates a second sensor reading 520 that is captured at a second point in time (i.e., t2) which is subsequent to t1. For example, the vehicle may capture the second sensor reading 520 based on a time elapsed since the first sensor reading 510 or a distance traveled since the first sensor reading 510. The second sensor reading 520 includes lane lines 521, 522, and 523 within the content of the frame. In addition, the second sensor reading 520 includes a ground plane estimate 524.

FIG. 5B illustrates a process 530 of projecting the lane lines 521, 522, and 523 from the second sensor reading 520 into a frame 540 which includes the lane lines 511, 512, and 513 from the first sensor reading 510. Here, the projecting may project 3D polylines of the lane lines 521, 522, and 523 from the lidar frame of sensor reading 520 into the frame 540 which includes the lane lines 511, 512, and 513 from the previous lidar frame. The projection may use the odometry from one frame (iteration of sensing) to the next. Thus, the system can analyze the lane lines 521, 522, and 523, with respect to the lane lines 511, 512, and 513, to determine if the calibration of one or more sensors that captured the lane lines are misaligned.

For example, the lane lines may be lidar points captured by the lidar sensors. For each sensor reading (lidar scan), the monitoring system may perform a lidar segmentation process to identify the lidar points that correspond to the lane lines. The lidar segmentation may be performed by executing a machine learning model on the lidar data to label each lidar point with a class type (category type) from among types such as "lane point", "road point", "road shoulder", "street sign", "barrier", etc. Furthermore, the monitoring system may detect lane lines in lane points based on straight collections of points in the segmented and labeled image. The monitoring system may also compute the ground plane fit around the vehicle using the lidar points.

For the lane lines 511, 512, and 513, the monitoring system can find the corresponding lane lines 521, 522, and 523, respectively, in the next scan (or previous scan) and construct a line-to-line association between the two sets of lane lines (or just between two corresponding lane lines). The monitoring system may also construct a factor graph of lane-to-line association factors and plane fit ground points, such as the factor graph 400 shown in the example of FIG. 4A. The monitoring system may optimize the factor graph to compute the ideal calibration. Furthermore, the monitoring system may compare a calibration of a sensor with a threshold or other nominal value that may be predefined or set by a user, and determine a difference. The difference can be used to determine whether the respective sensor is properly calibrated. This process may only be used for lidar monitoring while camera monitoring may involve a simpler approach as further described below.

As shown in FIG. 5B, a line-to-line cost minimization (e.g., a line-to-line factor) may be used to determine whether the calibration is proper or not. Here, the monitoring system may compute a differentiable factor that computes line similarity. For example, the system may transform line 521 into the same frame as lane line 511 and compute an angular difference 542 between the lane line 521 and the lane line 511. Here, the system may use a line 541 to represent the angle of the lane line 511 for comparison with the lane line 521. In addition, the system may compute a distance value 543 between the lane line 521 and the lane line 511. As an example, the system may project the midpoint of the lane line 521 to the other lane line 511, and compute a distance from the midpoint to a midpoint of the lane line 511.

The angular difference 542 and the distance value 543 can be used to determine the accuracy of the calibration. If the calibration is misaligned, the system can determine to auto-calibrate the sensors or it can disable the vehicle. In some embodiments, the system may attempt to auto-calibrate the vehicle in real-time before disabling the vehicle. If the calibration is unsuccessful, the system may detect the unsuccessful calibration via continued monitoring and disable the vehicle at that time. As another example, if the calibration is misaligned beyond a critical threshold, the vehicle may be disabled without trying to calibrate.

FIG. 5C illustrates a process 550 of analyzing the ground plane estimates 514 and 524 with respect to each other within an image 560 to determine whether the calibration of the sensors is proper. Here, the system may detect a ground plane beneath the truck by fitting lidar points to a three-dimensional (3D) plane model. The system may perform iterative random sample consensus (RANSAC) to refine the plane fit of lidar points. The lidar points may be filtered to only include those nearby the truck and those labeled as road points. Points may be labeled using a machine learned lidar segmentation model. Furthermore, a ground plane cost minimization (e.g., a ground plane factor) may be computed. For example, the difference between the measured ground plane and the vehicle origin XY plane is computed to detect miscalibration for the lidar. This may be introduced as a factor in a factor graph such as factor graph 400 shown in FIG. 4A, to smoothly estimate the miscalibration. An additional factor that compares the ground plane with the previously measured ground plane may be introduced to improve the calibration estimation. This factor computes the roll, pitch, and distance between the two planes. The former plane may be transformed into a later frame using the odometry of the vehicle. The system assumes the vehicle drives over relatively flat ground. As a result, minimizing the difference between consecutive ground planes produces a smoother estimate for the lidar calibration.

The monitoring system described herein may continuously monitor the quality of calibration (i.e., the calibration state) of the vehicle sensors. If at some point, one or more of the sensors are determined to be misaligned (lacking proper calibration), the system can auto-calibrate the sensors based on the same data (or additional data) that is captured of the road on which the vehicle is travelling. A similar process is described in co-pending U.S. patent application Ser. No. 17/383,504, filed on Jul. 23, 2022, in the United States Patent and Trademark Office, the entire disclosure of which is hereby incorporated by reference for all purposes. To perform the calibration, the host system (e.g., the vehicle's computer) may build a calibration target from the lane lines (or other object data within or around the road) which is captured by the sensors.

Figure 6A:
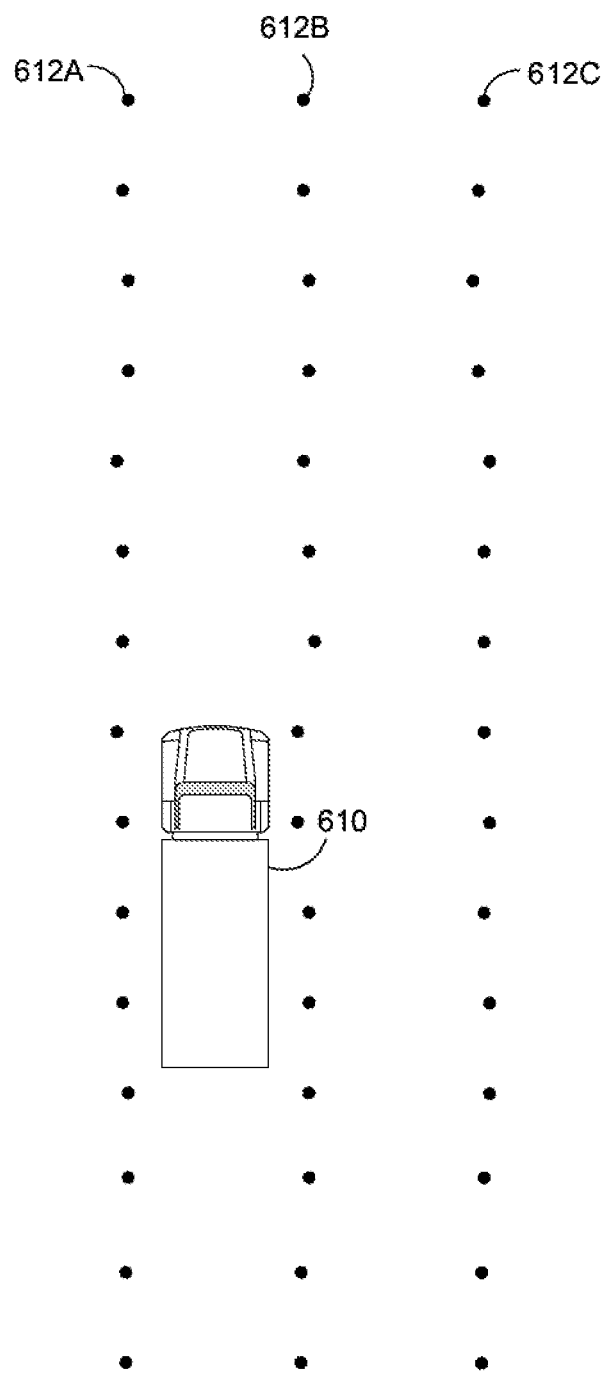
FIGS. 6A-6C are diagrams illustrating a process of generating a calibration target in accordance with example embodiments.
Figure 6B:
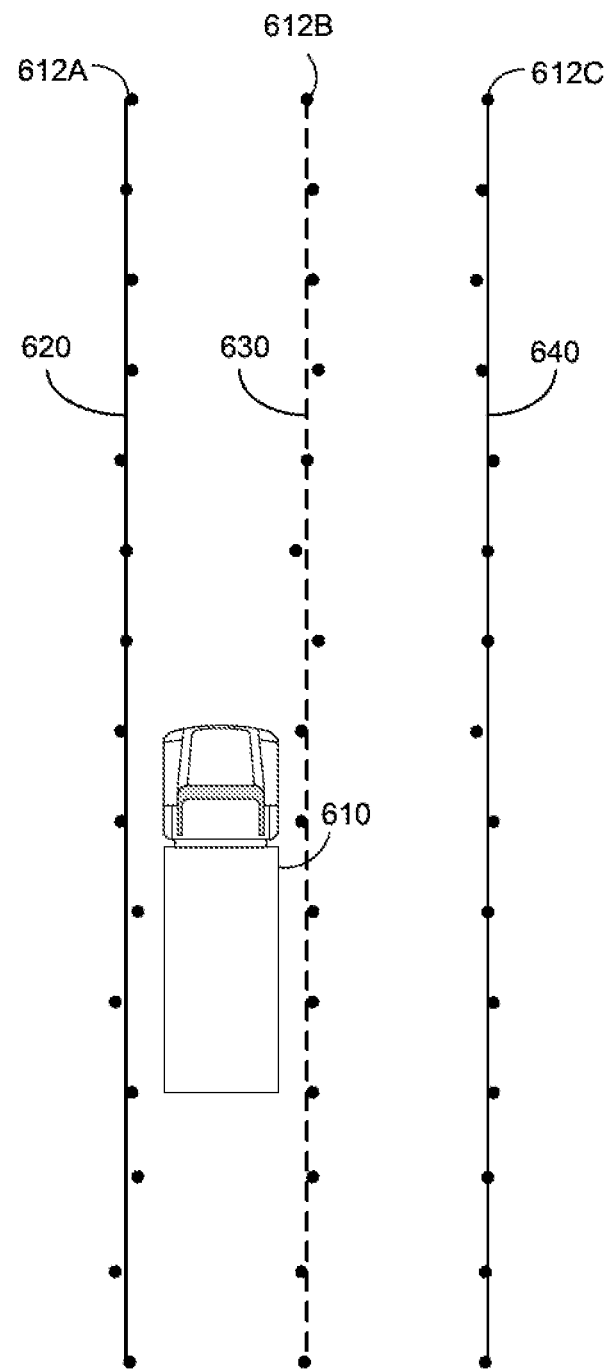
Figure 6C:
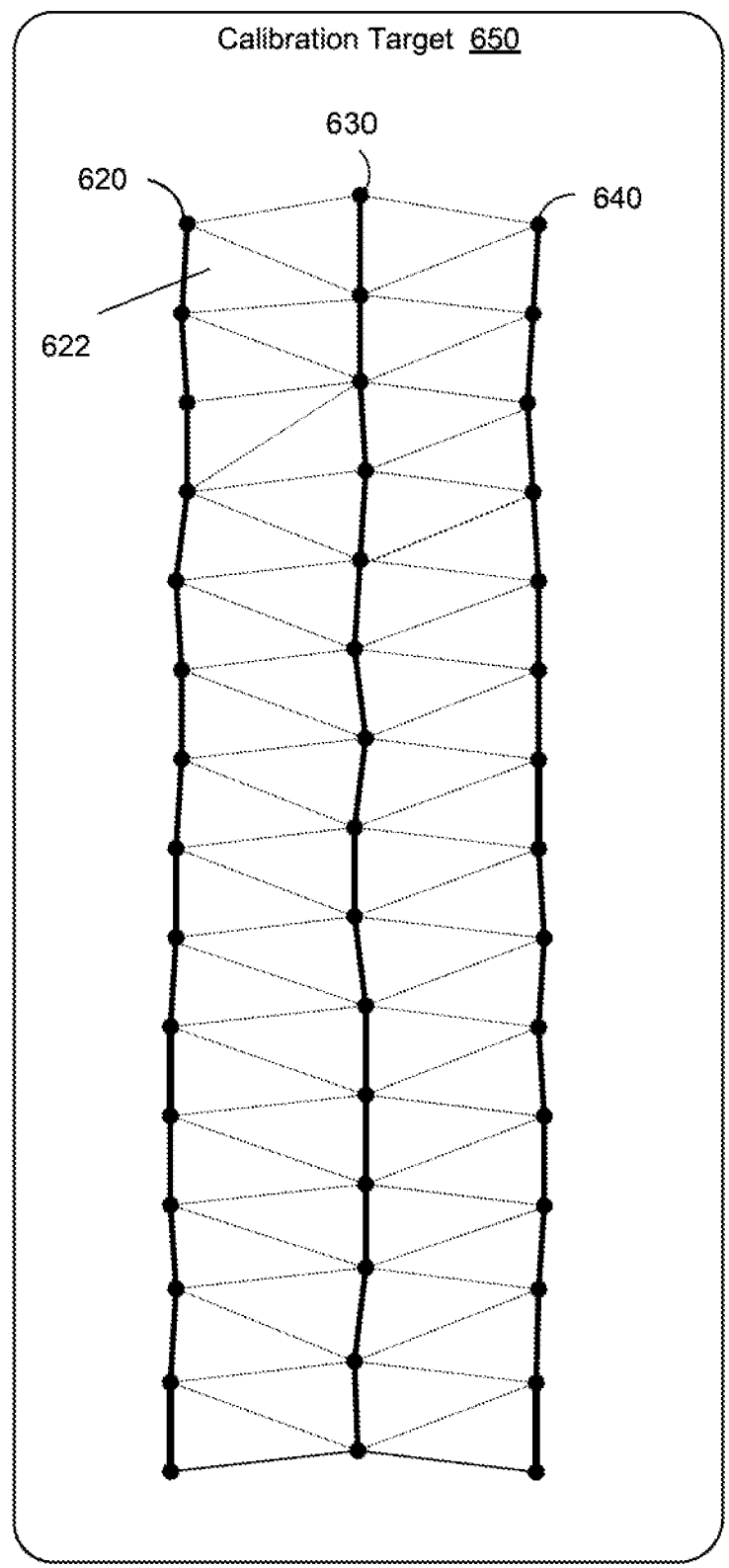

As further described herein with respect to FIGS. 6A-6C, a calibration target (e.g., calibration target 650 shown in FIG. 6C, etc.) may be generated from the sensor data captured of the lane lines on the road where the vehicle is travelling. The calibration target may include a multi-dimensional image (e.g., a virtual road map, etc.) that includes the lane lines represented as three-dimensional (3D) polylines along with a tessellation of these lane lines to form a road surface. For example, the lidar data points captured by the vehicle's lidar system may be filtered to select lidar data points that are likely to be lane lines using a lane line detector which is further described with respect to FIG. 2B. The selected lidar data points can be incorporated into a 3D virtual model or representation.

For example, the lane lines may be 3D polylines of lidar data points. The remaining lidar points not considered to be lane lines can be removed from the 3D virtual model. The vehicle's computer may assign an ID per lidar point associating it to a tracked lane line from among a plurality of lane lines in the virtual representation. The road tessellation may be generated by calculating a Delaunay triangulation of the lane lines in two-dimensions and then exporting the triangles that result from the Delaunay triangulation back to the 3D representation of the road. Unnecessary triangles formed during the triangulation may be filtered out based on their shape. A set of heuristics may be used to only select triangles likely to be formed within a lane rather than between merging lanes, parallel lane groups, or the like.

The virtual model of the lane lines can also be used in the optimization to provide a reference to which all lidars are aligned. Because lidar data is sparse (a set of points) it can be difficult to align one lidar sensor with another. However, in the example embodiments, by estimating the lane lines in a 3D virtual space, the vehicle's computer can align lidar points to these lines, which results in alignment between lidars. In this case, the vehicle may estimate the lane lines and the lidar calibrations simultaneously. Furthermore, the cameras may be calibrated by projecting the virtual lane lines back into an image of the lane lines captured by the cameras, and scoring the camera alignment to lane lines in the image. As a result the calibration process relies on first calibrating lidars to properly calibrate the camera. In operation this is done simultaneously.

That is, an extrinsic calibration of the vehicle's cameras and lidar sensors can be performed without having to take the vehicle off the road and place it on a rotating slab while images are captured of paperboard cutout targets. Instead, the calibration can be performed based on a calibration target that is created virtually by the vehicle based off data sensed from a road on which the vehicle is travelling (i.e., while the vehicle is in motion in real time). This calibration is significantly more efficient than the related calibration techniques which require physical/printed calibration targets and a rotating slab on which the vehicle must be perched while capturing images of the printed calibration targets. As a result, the calibration is performed in real time on the same data that is being captured by the vehicle while it is in motion.

FIG. 6A illustrates a process 600A of a vehicle 610 capturing lidar points around the vehicle 610. Here, the vehicle 610 may be travelling on a road (not shown) such as an interstate, a highway, a city block, or the like. Here, the vehicle 610 may be equipped with lidar sensors capable of detecting lidar points around the vehicle in all directions. For example, the lidar points may be captured periodically or at predetermined intervals referred to herein as frames. Each frame of sensor data captured by the vehicle may be partially overlapping with a previous frame thereby creating a continuous plane of lidar points using intervals/readings of the lidar sensors. In some embodiments, the vehicle 610 may also capture image data via a camera (not shown) at the same intervals as the lidar points are captured. Thus, the vehicle 610 may accumulate both the lidar points of the road and images of the road as the vehicle 610 continues its journey along the road. The captured lidar points may be stored in the factor graph 400 shown in FIG. 4A.

In the example of FIG. 6A, the vehicle 610 (e.g., the vehicle's computer) may analyze the lidar points to detect rows/lines of lidar points 612A, 612B, and 612C that correspond to lane lines of the road. As an example, the vehicle 610 may execute a lidar segmentation model which labels the lidar points 612A, 612B, and 612C (e.g., as points on a lane line, etc.). Here, the lidar points 612A, 612B, and 612C are only a subset of the lidar points. Remaining lidar points that are not selected as lane lines can be discarded or used for determining additional data.

The lane line detector may perform lane line detection (segmentation) from raw lidar data based on different approaches. For example, a first approach is a classic intensity-based voxel filter. This filter relies on intensity values per lidar return. This is common for most lidar sensors. The approach works by first grouping all points into 2D voxels (squares) and identifying the brightest points within each voxel. A number of heuristics are then used to identify bright voxels which are generally flat, and have dim neighboring voxels. This works because lane lines are often painted with reflective paint and are on flat ground. All other points are discarded. A second approach is a machine learning mode/neural network for lidar segmentation. In this approach a large amount of lidar data is hand labeled with a class per lidar point. This data is then used to train a neural network to automatically label lidar points. At least one of the labeled classes is lane line. In addition, the machine learning model may also label road surface, signs, poles, etc.

FIG. 6B illustrates a process 600B of the vehicle 610 constructing a calibration target from the lidar points 612A, 612B, and 612C. Here, the vehicle's computer may estimate lane lines 620, 630, and 640 based on the lidar points 612A, 612B, and 612C, and assign an identifier to each lidar point that is detected as part of the lane lines 620, 630, and 640, associating it to a corresponding lane line. For example, each lidar data point in the lidar points 612A may be assigned an identifier of the lane line 620. Likewise, each data point in the lidar points 612B may be assigned an identifier of the lane line 630 that is different from the ID assigned to the data points in the lane line 620. Likewise, each data point in the lidar points 612C may be assigned an identifier of the lane line 640, which is different from the respective identifiers of assigned to the lidar points assigned to lane lines 620 and 630.

FIG. 6C illustrates a process 600C of creating a calibration target 650 which in this example is a multi-dimensional model of the lane lines which have been tessellated to create a plurality of triangles 622 that interconnect polylines 620, 630, and 640, representing the three lane lines. The lidars on the vehicle may sense positions of the road including the lane lines. The system may identify lidar points in and around the vehicle such as lidar points on a lane line, lidar points on an object in the road, lidar points on a barrier, lidar points on a street sign, lidar points on an object in the road, etc. based on a lidar segmentation process which labels the lidar points. The calibration target can be initialized based on the lidar points that are segmented/identified as lane lines. Next, the system may execute a Delaunay triangulation model/algorithm on the lane lines to form a road surface by tessellating the lane lines. Furthermore, as previously noted, the triangles may be filtered to remove triangles without sufficient road/lane labelled lidar points. Also, unnecessary triangles may be formed and they can be removed based on their shape. The tessellation results in a road surface which can be used to help solve sensor calibrations along with the lane lines. The calibration target 650 may be stored as a file in a format of within the computer of the vehicle 610. The calibration target 650 can be used to calibrate the lidar sensors and the cameras.

The calibration process may be performed by solving for sensor calibrations (both lidar and camera). To do this, the system may build a map of the road around the truck as it is in motion using a factor graph such as in the example shown in FIG. 4A. Using sensor measurements, the system can initialize and observe this map. Furthermore, by optimizing the factor graph, the system can refine both the road map and the sensor calibrations. For example, the road map, the lane boundaries, the sensor calibrations, the lidar calibrations, the camera calibrations, the vehicle nodes, the odometry pose, and the like, of the vehicle may be calibrated during the process. As previously noted, the factors in the factor graph that may be optimized include, but are not limited to, factors associated with lidar such as lidar lane factor, lidar road factor, local ground plane factor, lidar calibration factor, factors associated with cameras such as camera SDF factor, and camera calibration prior factor, factors associated with the road map such as lane curvature factor and lane prior factor, and factors associated with the ego vehicle including odometry factor and vehicle plane factor.

Figure 7A:
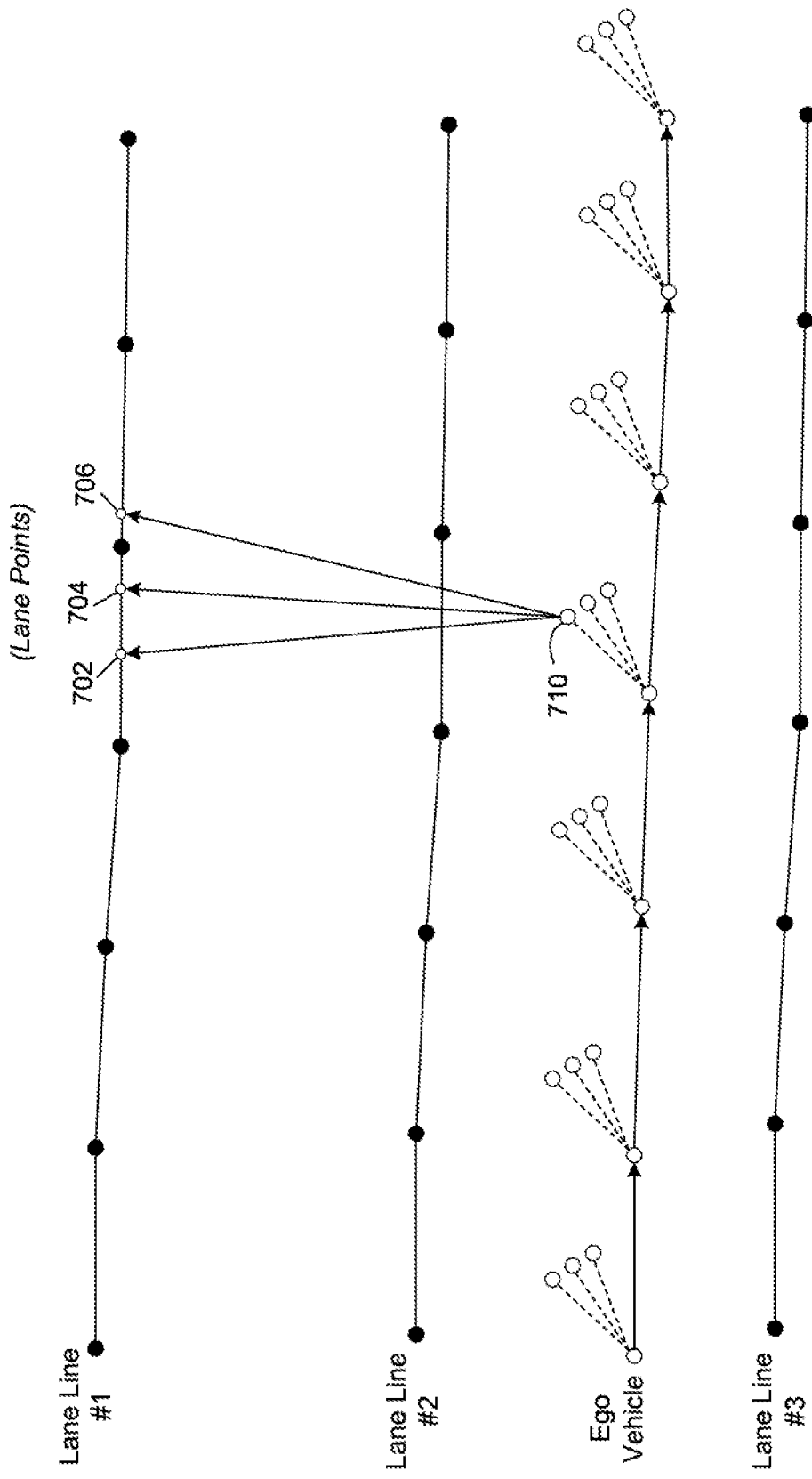
FIGS. 7A-7B are diagrams illustrating a process of calibrating sensors of a vehicle in accordance with example embodiments.

FIG. 7A illustrates a process 700A of calibrating sensors of a vehicle based on sensed data points on a lane line using a factor graph accordance with example embodiments. Referring to FIG. 7A, a left lidar sensor is represented by a node 710 in the factor graph. The left lidar is observing points 702, 704, and 706 on a lane line boundary. These points are considered in the optimization with the lidar lane factors. A lidar lane factor can be created for each lidar point labeled as a lane point that is near a lane line. This factor measures the perpendicular distance between the point and the lane line. The factor depends on the variables of the vehicle pose before and after the lidar scan, the sensor calibration, and the virtual lane line polyline. The factor is includes mathematical derivatives that relate any change in the dependent variables and the output cost. This relationship allows an optimizer to modify the dependent variables, including the sensor calibration and the virtual lane line positions, to reduce the measured cost.

Figure 7B:
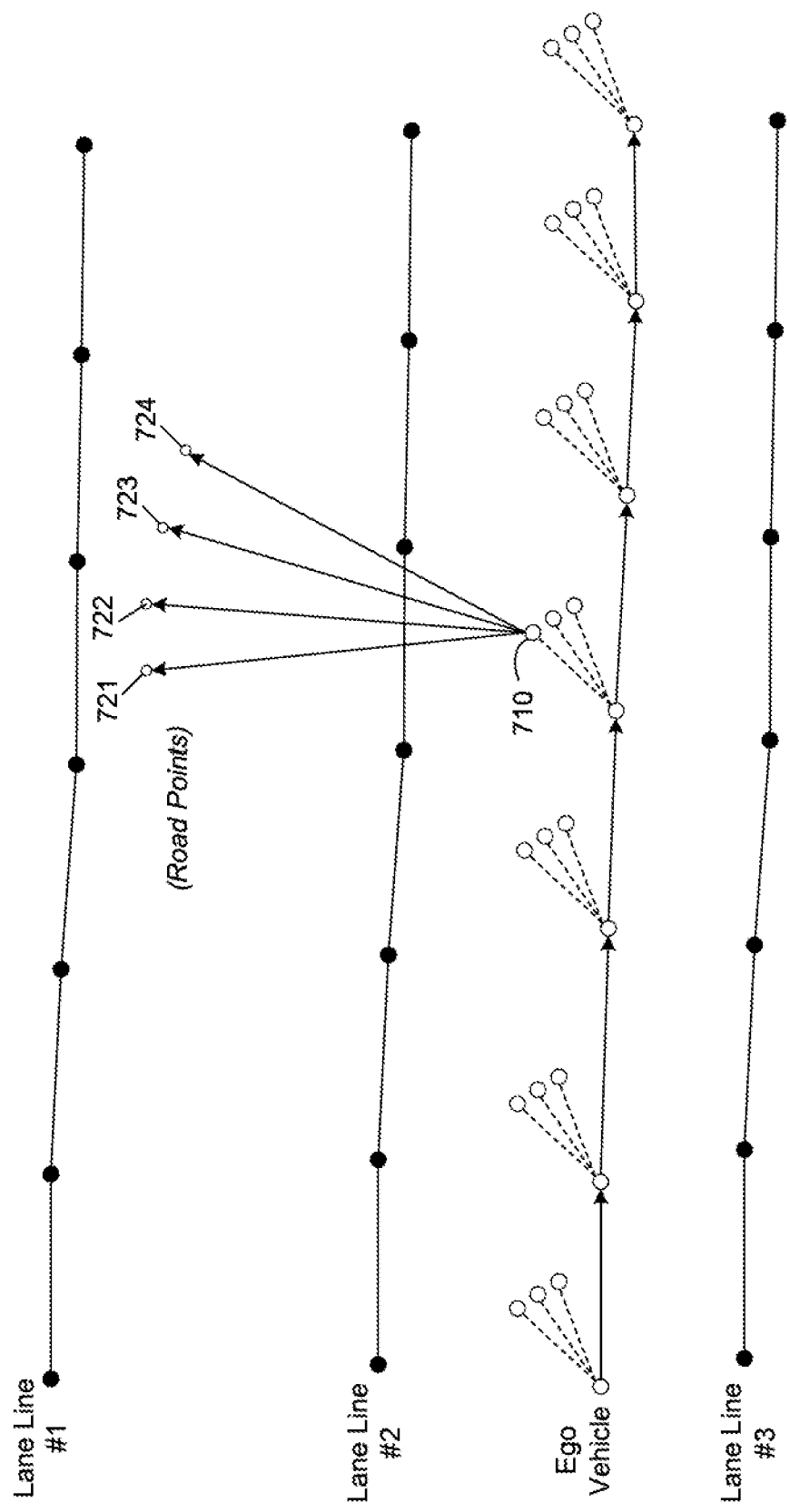

FIG. 7B illustrates a process 700B of calibrating sensors of a vehicle based on sensed data points on a road surface using a factor graph accordance with example embodiments. Referring to FIG. 7B, the left lidar sensor is represented by the node 710 in the factor graph. The left lidar is observing points 722, 724, 726, and 728 on surface of the road between and not touching any lane lines. These points are considered in the optimization with the lidar road factors. In this example, the factors compute the distance between the lidar points 722, 724, 726, and 728 and the plane formed by the closest triangle of the road map tessellation (referred to as the associated triangle). This factor depends on the variables of the vehicle pose before and after the lidar scan, the sensor calibration, and the three points from the virtual lane lines forming the associated triangle. The factor includes mathematical derivatives that relate any change in the dependent variables and the output cost. This relationship allows an optimizer to modify the dependent variables, including the sensor calibration and the virtual lane line positions, to reduce the measured cost.

FIG. 8 illustrates a method 800 for calibrating vehicle sensors from on-road sensor data in accordance with an example embodiment. As an example, the method 800 may be performed by a vehicle's computer, a network-connected server, a user device, a cloud platform, or the like. Referring to FIG. 8, in 810, the method may include iteratively receiving, from a plurality of sensors of a vehicle, sensor data associated with a surrounding environment of the vehicle while the vehicle is travelling in the surrounding environment. The surrounding environment may include an "on-road" environment where the vehicle is travelling along a pre-established road with lane lines, etc. Another example of a surrounding environment is "off-road" where the vehicle may be travelling off of a pre-established road or a road that is unknown to the vehicle. The sensor data may include lidar points sensed by lidar sensors, images sensed by cameras and other imaging equipment, radar, and the like.

In 820, the method may include monitoring a calibration of the one or more sensors of the vehicle based on the iteratively received sensor data. Here, the system may analyze an object included in the sensed data, such as a lane line. The system may use the lane line to compare images captured by the sensors to determine whether the calibration is accurate. In 830, the method may include determining that the one or more sensors of the vehicle are not calibrated properly based on the monitoring. In 840, the method may include generating a calibration target of an object within the surrounding environment based on the iteratively received sensor data. As an example, the calibration target may be generated from a lane line, a tree, a parked vehicle, a sign, a street light, and the like. In 850, the method may include adjusting a calibration parameter of the one or more sensors of the vehicle based on the generated calibration target.

In some embodiments, the monitoring may include generating multiple measurements of a ground plane around the vehicle at multiple points in time, respectively, based on lidar points captured by the one or more sensors and a machine learning model. In some embodiments, the determining may include determining that the ground plane calibration is not properly calibrated based on a comparison of the multiple images of the ground plane and a ground plane cost minimization function. In some embodiments, the monitoring may include generating multiple images of a lane line on the road at multiple points in time, respectively, based on lidar points captured by the one or more sensors and a machine learning model. In some embodiments, the determining may include determining that a lidar sensor calibration is not properly calibrated based on a comparison of the multiple images of the lane line and a line-to-line cost minimization function.

In some embodiments, the monitoring may include generating an image of a lane line based on one or more images captured via a camera of the vehicle and a machine learning model. In some embodiments, the determining may include projecting lane line points from a lidar scan into the image of the lane line captured via the camera and the determining comprises determining whether the camera is properly calibrated based on a comparison of the projected lane line points and the image of the lane line from the camera. In some embodiments, the generating may include dynamically generating the calibration target from lane line data captured of the road while travelling on the road and adjusting one or more of a lidar calibration parameters and a camera calibration parameter based on the dynamically generated calibration target. In some embodiments, the method may further include determining that the one or more sensors of the vehicle are still not calibrated properly after the adjusting based on additional monitoring, and in response, disabling the vehicle.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A vehicle comprising:
   a processor configured to
      iteratively receive sensor data associated with a surrounding environment while the vehicle is travelling through the surrounding environment
      monitor a calibration of the one or more sensors of the vehicle based on the iteratively received sensor data;
      determine that the one or more sensors of the vehicle are not calibrated properly based on the monitoring;
      generate a calibration target of an object in the surrounding environment based on the iteratively received sensor data; and
      adjust a calibration parameter of the one or more sensors of the vehicle based on the generated calibration target.

2. The vehicle of claim 1, wherein the processor is configured to receive multiple measurements of a ground plane around the vehicle at multiple points in time, respectively, based on lidar points captured by the one or more sensors and a machine learning model.

3. The vehicle of claim 2, wherein the processor is configured to determine that a lidar sensor is not properly calibrated based on a comparison of the multiple measurements of the ground plane and a ground plane cost minimization function.

4. The vehicle of claim 1, wherein the vehicle is travelling on a road within the surrounding environment.

5. The vehicle of claim 4, wherein the processor is configured to generate multiple measurements of a lane line on the road at multiple points in time, respectively, based on lidar points captured by the one or more sensors and a machine learning model.

6. The vehicle of claim 5, wherein the processor is configured to determine that a lidar sensor is not properly calibrated based on a comparison of the multiple measurements of the lane line and a line-to-line cost minimization function.

7. The vehicle of claim 1, wherein the processor is configured to project lidar points labeled as lane lines points or road points, captured by a lidar sensor, into one or more images captured by a camera of the vehicle.

8. The vehicle of claim 7, wherein the processor is configured to calibrate the camera of the vehicle based on a difference in alignment between the labeled lidar points and corresponding image points of the one or more images captured by the camera and based on one or more cost functions.

9. The vehicle of claim 1, wherein the processor is configured to dynamically generate the calibration target from lane line data captured of a road and adjust one or more of a lidar calibration parameter and a camera calibration parameter based on the dynamically generated calibration target.

10. The vehicle of claim 1, wherein the processor is further configured to continue to monitor the one or more sensors, determine that the one or more sensors of the vehicle are still not calibrated properly after the adjusting based on the continued monitoring, and in response, disable the vehicle.

11. A method comprising:
   iteratively receiving sensor data associated with a surrounding environment while the vehicle is travelling through the surrounding environment
   monitoring a calibration of the one or more sensors of the vehicle based on the iteratively received sensor data;
   determining that the one or more sensors of the vehicle are not calibrated properly based on the monitoring;
   generating a calibration target of an object in the surrounding environment based on the iteratively received sensor data; and
   adjusting a calibration parameter of the one or more sensors of the vehicle based on the generated calibration target.

12. The method of claim 11, wherein the iteratively receiving comprises receiving multiple measurements of a ground plane around the vehicle at multiple points in time, respectively, based on lidar points captured by the one or more sensors and a machine learning model.

13. The method of claim 12, wherein the determining comprises determining that a lidar sensor is not properly calibrated based on a comparison of the multiple measurements of the ground plane and a ground plane cost minimization function.

14. The method of claim 11, wherein the vehicle is travelling on a road within the surrounding environment.

15. The method of claim 14, wherein the receiving comprises receiving multiple measurements of a lane line on the road at multiple points in time, respectively, based on lidar points captured by the one or more sensors and a machine learning model, and the determining comprises determining that a lidar sensor is not properly calibrated based on a comparison of the multiple measurements of the lane line and a line-to-line cost minimization function.

16. The method of claim 11, wherein the generating comprises projecting lidar points labeled as lane lines points or road points, captured by a lidar sensor, into one or more images captured by a camera of the vehicle.

17. The method of claim 16, wherein the adjusting comprises calibrating the camera of the vehicle based on a difference in alignment between the labeled lidar points and corresponding image points of the one or more images captured by the camera and based on one or more cost functions.

18. The method of claim 11, wherein the generating comprises dynamically generating the calibration target from lane line data captured of a road and adjust one or more of a lidar calibration parameter and a camera calibration parameter based on the dynamically generated calibration target.

19. A computing system comprising:
   a memory configured to store sensor data associated with a road captured by one or more sensors of a vehicle in motion on the road; and
   a processor configured to
      monitor a calibration of the one or more sensors of the vehicle based on the received sensor data;
      determine that the one or more sensors are not calibrated properly based on the monitoring;
      generate a calibration target of an object on the road based on the received sensor data; and adjust a calibration parameter of the one or more sensors of the vehicle based on the generated calibration target.

20. The computing system of claim 19, wherein the processor is configured to dynamically generate the calibration target from lane line data captured of the road and adjust one or more of a lidar calibration parameter and a camera calibration parameter based on the dynamically generated calibration target.

* * * * *